(12) United States Patent
Hua et al.

(10) Patent No.: US 11,150,449 B2
(45) Date of Patent: Oct. 19, 2021

(54) HEAD-MOUNTED PROJECTION DISPLAY USING REFLECTIVE MICRODISPLAYS

(71) Applicant: Arizona Board of Regents on Behalf of the University of Arizona, Tucson, AZ (US)

(72) Inventors: Hong Hua, Tucson, AZ (US); Rui Zhang, Kirkland, WA (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 0 days.

(21) Appl. No.: 16/685,204

(22) Filed: Nov. 15, 2019

(65) Prior Publication Data
US 2020/0110250 A1   Apr. 9, 2020

Related U.S. Application Data

(60) Continuation of application No. 16/170,860, filed on Oct. 25, 2018, now Pat. No. 10,495,859, which is a
(Continued)

(51) Int. Cl.
*G02B 13/22* (2006.01)
*G02B 27/01* (2006.01)
(Continued)

(52) U.S. Cl.
CPC ........... *G02B 13/22* (2013.01); *G02B 5/3083* (2013.01); *G02B 13/004* (2013.01); *G02B 13/0065* (2013.01); *G02B 13/04* (2013.01); *G02B 13/16* (2013.01); *G02B 27/0172* (2013.01); *G02B 5/30* (2013.01); *G02B 9/34* (2013.01);
(Continued)

(58) Field of Classification Search
CPC .... G02B 13/22; G02B 5/3083; G02B 13/004; G02B 13/0065; G02B 13/04; G02B 13/16; G02B 27/0172; G02B 5/30; G02B 9/34; G02B 27/286; G02B 2027/0118; G02B 2027/0123
See application file for complete search history.

(56) References Cited

U.S. PATENT DOCUMENTS 3,632,184 A   1/1972   King
3,992,084 A   11/1976  Nakamura
(Continued)

FOREIGN PATENT DOCUMENTS

CN   1252133 A     5/2000
CN   101359089 A   2/2009
(Continued)

OTHER PUBLICATIONS

US 9,207,443 B2, 12/2015, Cheng (withdrawn)
(Continued)

*Primary Examiner* — Tony Ko
(74) *Attorney, Agent, or Firm* — Niels Haun; Dann, Dorfman, Herrell & Skillman, P.C.

(57) ABSTRACT

The present invention relates generally to a head-mounted projection display, and more particularly, but not exclusively to a polarized head-mounted projection display including a light engine and a compact, high-performance projection lens for use with reflective microdisplays.

18 Claims, 15 Drawing Sheets

Related U.S. Application Data continuation of application No. 15/092,831, filed on Apr. 7, 2016, now Pat. No. 10,146,029, which is a continuation of application No. 13/955,076, filed on Jul. 31, 2013, now Pat. No. 9,310,591, which is a division of application No. 12/863,771, filed as application No. PCT/US2009/031606 on Jan. 21, 2009, now Pat. No. 8,511,827.

(60) Provisional application No. 61/011,789, filed on Jan. 22, 2008.

(51) Int. Cl.

| | | |
|---|---|---|
| *G02B 5/30* | (2006.01) | |
| *G02B 13/00* | (2006.01) | |
| *G02B 13/04* | (2006.01) | |
| *G02B 13/16* | (2006.01) | |
| *G02B 9/34* | (2006.01) | |
| *G02B 27/28* | (2006.01) | |

(52) U.S. Cl.
CPC .... *G02B 27/286* (2013.01); *G02B 2027/0118* (2013.01); *G02B 2027/0123* (2013.01)

(56) References Cited

U.S. PATENT DOCUMENTS

| | | |
|---|---|---|
| 4,468,101 A | 8/1984 | Ellis |
| 4,669,810 A | 6/1987 | Wood |
| 4,753,522 A | 6/1988 | Nishina |
| 4,863,251 A | 9/1989 | Herloski |
| 5,109,469 A | 4/1992 | Duggan |
| 5,172,272 A | 12/1992 | Aoki |
| 5,172,275 A | 12/1992 | Dejager |
| 5,416,315 A | 5/1995 | Filipovich |
| 5,436,763 A | 7/1995 | Chen |
| 5,526,183 A | 6/1996 | Chen |
| 5,572,229 A | 11/1996 | Fisher |
| 5,621,572 A | 4/1997 | Fergason |
| 5,625,495 A | 4/1997 | Moskovich |
| 5,699,194 A | 12/1997 | Takahashi |
| 5,701,202 A | 12/1997 | Takahashi |
| 5,706,136 A | 1/1998 | Okuyama |
| 5,818,632 A | 10/1998 | Stephenson |
| 5,880,711 A | 3/1999 | Tamada |
| 5,880,888 A | 3/1999 | Schoenmakers |
| 5,917,656 A | 6/1999 | Hayakawa |
| 5,959,780 A | 9/1999 | Togino |
| 6,008,781 A | 12/1999 | Furness |
| 6,023,373 A | 2/2000 | Inoguchi |
| 6,028,606 A | 2/2000 | Kolb |
| 6,034,823 A | 3/2000 | Togino |
| 6,198,577 B1 | 3/2001 | Kedar |
| 6,201,646 B1 | 3/2001 | Togino |
| 6,236,521 B1 | 5/2001 | Nanba |
| 6,239,915 B1 | 5/2001 | Takagi |
| 6,243,199 B1 | 6/2001 | Hansen |
| 6,271,972 B1 | 8/2001 | Kedar |
| 6,384,983 B1 | 5/2002 | Yamazaki |
| 6,396,639 B1 | 5/2002 | Togino |
| 6,404,561 B1 | 6/2002 | Isono |
| 6,404,562 B1 | 6/2002 | Ota |
| 6,433,376 B2 | 8/2002 | Kim |
| 6,433,760 B1 | 8/2002 | Vaissie |
| 6,493,146 B2 | 12/2002 | Inoguchi |
| 6,510,006 B1 | 1/2003 | Togino |
| 6,563,648 B2 | 5/2003 | Gleckman |
| 6,646,811 B2 | 11/2003 | Inoguchi |
| 6,653,989 B2 | 11/2003 | Nakanishi |
| 6,671,099 B2 | 12/2003 | Nagata |
| 6,731,434 B1 | 5/2004 | Hua |
| 6,829,113 B2 | 12/2004 | Togino |
| 6,963,454 B1 | 11/2005 | Martins |
| 6,999,239 B1 | 2/2006 | Martins |
| 7,152,977 B2 | 12/2006 | Ruda |
| 7,177,083 B2 | 2/2007 | Holler |
| 7,230,583 B2 | 6/2007 | Tidwell |
| 7,249,853 B2 | 7/2007 | Weller-Brophy |
| 7,405,881 B2 | 7/2008 | Shimizu |
| 7,414,791 B2 | 8/2008 | Urakawa |
| 7,522,344 B1 | 4/2009 | Curatu |
| 8,467,133 B2 | 6/2013 | Miller |
| 8,503,087 B1 | 8/2013 | Amirparviz |
| 8,511,827 B2 | 8/2013 | Hua |
| 9,201,193 B1 | 12/2015 | Smith |
| 9,239,453 B2 | 1/2016 | Cheng |
| 9,310,591 B2 | 4/2016 | Hua |
| 9,720,232 B2 | 8/2017 | Hua |
| 9,874,760 B2 | 1/2018 | Hua |
| 2001/0009478 A1 | 7/2001 | Yamazaki |
| 2002/0015116 A1 | 2/2002 | Park |
| 2002/0060850 A1 | 5/2002 | Takeyama |
| 2002/0063913 A1 | 5/2002 | Nakamura |
| 2002/0067467 A1 | 6/2002 | Dorval |
| 2002/0181115 A1 | 12/2002 | Massof |
| 2003/0076591 A1 | 4/2003 | Ohmori |
| 2003/0090753 A1 | 5/2003 | Takeyama |
| 2004/0136097 A1 | 7/2004 | Park |
| 2004/0164927 A1 | 8/2004 | Suyama |
| 2004/0196213 A1 | 10/2004 | Tidwell |
| 2004/0218243 A1 | 11/2004 | Yamazaki |
| 2004/0233551 A1 | 11/2004 | Takahashi |
| 2005/0036119 A1 | 2/2005 | Ruda |
| 2005/0179868 A1 | 8/2005 | Seo |
| 2005/0248849 A1 | 11/2005 | Urey |
| 2006/0028400 A1 | 2/2006 | Lapstun |
| 2006/0119951 A1* | 6/2006 | McGuire, Jr. ...... G02B 27/1026 359/630 |
| 2007/0109505 A1 | 5/2007 | Kubara |
| 2007/0246641 A1 | 10/2007 | Baun |
| 2008/0036853 A1 | 2/2008 | Shestak |
| 2008/0094720 A1 | 4/2008 | Yamazaki |
| 2008/0291531 A1 | 11/2008 | Heimer |
| 2009/0115842 A1 | 5/2009 | Saito |
| 2009/0168010 A1 | 7/2009 | Vinogradov |
| 2009/0256943 A1 | 10/2009 | Kondo |
| 2010/0091027 A1 | 4/2010 | Oyama |
| 2010/0109977 A1 | 5/2010 | Yamazaki |
| 2010/0208372 A1 | 8/2010 | Heimer |
| 2010/0271698 A1 | 10/2010 | Kessler |
| 2010/0289970 A1 | 11/2010 | Watanabe |
| 2011/0037951 A1 | 2/2011 | Hua |
| 2011/0043644 A1 | 2/2011 | Munger |
| 2011/0075257 A1 | 3/2011 | Hua |
| 2011/0090389 A1 | 4/2011 | Saito |
| 2011/0221656 A1 | 9/2011 | Haddick |
| 2012/0013988 A1 | 1/2012 | Hutchin |
| 2012/0019557 A1 | 1/2012 | Aronsson |
| 2012/0050891 A1 | 3/2012 | Seidl |
| 2012/0057129 A1 | 3/2012 | Durnell |
| 2012/0081800 A1 | 4/2012 | Cheng |
| 2012/0113092 A1 | 5/2012 | Bar-Zeev |
| 2012/0160302 A1 | 6/2012 | Citron |
| 2012/0162549 A1 | 6/2012 | Gao |
| 2012/0242697 A1 | 9/2012 | Border |
| 2012/0262802 A1 | 10/2012 | Huang |
| 2013/0100524 A1 | 4/2013 | Magarill |
| 2013/0112705 A1 | 5/2013 | McGill |
| 2013/0182317 A1 | 7/2013 | Takahashi |
| 2013/0187836 A1 | 7/2013 | Cheng |
| 2013/0222896 A1 | 8/2013 | Komatsu |
| 2013/0258461 A1 | 10/2013 | Sato |
| 2013/0285885 A1 | 10/2013 | Nowatzyk |
| 2013/0286053 A1 | 10/2013 | Fleck |
| 2013/0300634 A1 | 11/2013 | White |
| 2013/0329304 A1 | 12/2013 | Hua |
| 2014/0009845 A1 | 1/2014 | Cheng |
| 2014/0071539 A1 | 3/2014 | Gao |
| 2014/0300869 A1 | 10/2014 | Hirsch |
| 2014/0361957 A1 | 12/2014 | Hua |
| 2015/0168802 A1 | 6/2015 | Bohn |
| 2015/0177445 A1 | 6/2015 | Takagi |
| 2015/0201176 A1 | 7/2015 | Graziosi |

(56) References Cited

U.S. PATENT DOCUMENTS

| | | |
|---|---|---|
| 2015/0208061 A1 | 7/2015 | Yang |
| 2015/0212321 A1 | 7/2015 | Zhao |
| 2015/0277129 A1 | 10/2015 | Hua |
| 2015/0346495 A1 | 12/2015 | Welch |
| 2015/0363978 A1 | 12/2015 | Maimone |
| 2016/0011419 A1 | 1/2016 | Gao |
| 2016/0085075 A1 | 3/2016 | Cheng |
| 2016/0239985 A1 | 8/2016 | Haddick et al. |
| 2016/0320620 A1 | 11/2016 | Maimone |
| 2017/0078652 A1 | 3/2017 | Hua |
| 2017/0102545 A1 | 4/2017 | Hua |
| 2017/0202633 A1 | 7/2017 | Liu |
| 2018/0045949 A1 | 2/2018 | Hua |

FOREIGN PATENT DOCUMENTS

| | | |
|---|---|---|
| CN | 101424788 A | 5/2009 |
| EP | 0408344 | 1/1991 |
| EP | 1102105 | 5/2001 |
| FR | 2928034 | 8/2009 |
| JP | 02200074 | 8/1990 |
| JP | H03101709 | 4/1991 |
| JP | 08160345 | 6/1996 |
| JP | H09218375 A | 8/1997 |
| JP | H09297282 | 11/1997 |
| JP | H1013861 | 1/1998 |
| JP | H10307263 | 11/1998 |
| JP | H11326820 A | 11/1999 |
| JP | 2000249974 | 9/2000 |
| JP | 2001013446 | 1/2001 |
| JP | 2001066543 A | 3/2001 |
| JP | 2001145127 | 5/2001 |
| JP | 2001238229 | 8/2001 |
| JP | 2002148559 | 5/2002 |
| JP | 2003241100 | 8/2003 |
| JP | 2006091333 | 4/2006 |
| JP | 2006276884 A | 10/2006 |
| JP | 2007101930 | 4/2007 |
| JP | 2010072188 | 4/2010 |
| JP | 2014505381 | 2/2014 |
| WO | 9923647 | 5/1999 |
| WO | 2004079431 A1 | 9/2004 |
| WO | 2007002694 A2 | 1/2007 |
| WO | 2007085682 | 8/2007 |
| WO | 2007002694 A3 | 12/2007 |
| WO | 2007140273 A2 | 12/2007 |
| WO | 2008089417 A2 | 7/2008 |
| WO | 2011134169 | 11/2011 |
| WO | 2012064546 | 5/2012 |
| WO | 2012118573 | 9/2012 |
| WO | 2013112705 | 8/2013 |
| WO | 2014062912 | 4/2014 |
| WO | 2015134738 | 9/2015 |
| WO | 2015134740 | 9/2015 |
| WO | 2016033317 | 3/2016 |
| WO | 2018052590 | 3/2018 |

OTHER PUBLICATIONS

US 9,213,186 B2, 12/2015, Cheng (withdrawn)
US 9,880,387 B2, 01/2018, Hua (withdrawn)
'Fresnel Lenses' downloaded from http://www.fresneltech.com on Jun. 8, 2011. Copyright Fresnel Technologies, Inc., 2003.
Azuma, R., et al., 'Recent advances in augmented reality', IEEE Computer Graphics App;. 21, 34-47 (2001).
Bajura, M., et al., "Merging virtual objects with the real world: seeing ultrasound imagery within the patient" in Proceedings of ACM SIGGRAPH (ACM, Chicago, 1992), pp. 203-210.
Biocca, et al., "Virtual eyes can rearrange your body: adapting to visual displacement in see-through, head-mounted displays", Presence: Teleoperators and Virtual Environments 7, 262-277 (1998).
Bunkenburg, J. 'Innovative Diffractive Eyepiece for Helmet-Mounted Display.' SPIE vol. 3430. pp. 41-49 Jul. 1998.
C. Curatu, H. Hua, and J. P. Rolland, "Projection-based headmounted display with eye-tracking capabilities," Proc. SPIE 5875, 587050J (2005).
Cakmakci, O., et al., 'Head-Worn Displays: A Review'. Journal of Display Technology, vol. 2, No. 3, Sep. 2006, pp. 199-216.
Caudell, T., et al., "Augmented reality: an application of heads-up display technology to manual manufacturing processes" in Proceedings of Hawaii International Conferences on Systems Sciences (Hawaii, 1992), pp. 659-669.
Cruz-Neira et al., 'Surround-Screen Projection-Based Virtual Reality: the Design and Implementation of the Cave,' Proceedings of the 20th Annual Conference on Computer Graphics and Interactive Techniques pp. 135-142, ACM SIGGRAPH, ACM Press (1993).
Examination Report dated Apr. 29, 2011 from corresponding GB Application No. GB1012165.5.
H. Hua, C. Gao, and J. P. Rolland, 'Study of the Imaging properties of retroreflective materials used in head-mounted projective displays (HMPDs),' Proc. SPIE4711, 194-201 (2002).
H. Hua, C. Gao, F. Biocca, and J. P. Rolland, "An ultra-light and compact design and implementation of head-mounted projective displays," in Proceedings of IEEE VR 2001, pp. 175-182.
H. Hua, L. Brown, and C. Gao, "A new collaborative infrastructure: SCAPE," in Proceedings of IEEE VR 2003 (IEEE, 2003), pp. 171-179.
H. Hua, L. Brown, and C. Gao, "SCAPE: supporting stereoscopic collaboration in augmented and projective environments," IEEE Comput. Graphics Appl. 24, 66-75 (2004).
H. Hua, L. Brown, and C. Gao, "System and interface framework for SCAPE as a collaborative infrastructure," Presence: Teleoperators and Virtual Environments 13, 234-250 (2004).
H. Hua, Y. Ha, and J. P. Rolland, 'Design of an ultra-light and compact projection lens,' Appl. Opt. 42, 1-12 (2003), pp. 97-107.
H. Hua., A. Girardot, C. Gao. J. P. Rolland. 'Engineering of head-mounted projective displays'. Applied Optics. 39 (22), pp. 3814-3824. (2000).
H. Hua and C. Gao, "A polarized head-mounted projective display," in Proceedings of IEEE and ACM International Symposium on Mixed and Augmented Reality 2005 (IEEE, 2005), pp. 32-35.
Hua et al., 'Design of a Bright Polarized Head-Mounted Projection Display' Applied Optics 46:2600-2610 (2007).
International Search Report dated Mar. 9, 2009 with regard to International Patent Application No. PCT/ US2009/031606.
J. L. Pezzaniti and R. A. Chipman, "Angular dependence of polarizing beam-splitter cubes," Appl. Opt. 33, 1916-1929 (1994).
J. P. Rolland, F. Biocca, F. Hamza-Lup, Y. Ha, and R. Martins, "Development of head-mounted projection displays for distributed, collaborative, augmented reality applications," Presence: Teleoperators and Virtual Environments 14, 528-549 (2005).
J. P. Rolland and Hong Hua. "Head-mounted display systems," in Encyclopedia of Optical Engineering. R. Barry Johnson and Ronald O. Driggers, Eds, (2005).
Krueerke, Daniel, "Speed May Give Ferroelectric LCOS Edge in Projection Race," Display Devices Fall '05. Copyright 2005 Dempa Publications, Inc. pp. 29-31.
L. Brown and H. Hua, "Magic lenses for augmented virtual environments," IEEE Comput. Graphics Appl. 26, 64-73 (2006).
L. Davis, J. P. Rolland, F. Hamza-Lup, Y. Ha, J. Norfleet, and C. Imielinska, 'Enabling a continuum of virtual environment experiences,' IEEE Comput. Graphics Appl. 23, pp. 10-12 Mar./Apr. 2003.
M. Inami, N. Kawakami, and S. Tachi, 'Optical camouflage using retro-reflective projection technology,' in Proceedings of ISMAR 2003 {ISMAR, 2003).
M. Inami, N. Kawakami, D. Sekiguchi, Y. Yanagida, T. Maeda, and S. Tachi, "Visuo-haptic display using head-mounted projector," in Proceedings of IEEE Virtual Reality 2000, pp. 233-240.
M. Robinson. J. Chen, and G. Sharp, Polarization Engineering for LCD Projection. John Wiley & Sons, Ltd. England, 2005.
N. Kawakami, M. Inami, D. Sekiguchi, Y. Yangagida, T. Maeda, and S. Tachi, 'Object-oriented displays: a new type of display systemsfrom immersive display to object-oriented displays,' in Proceedings of IEEE SMC 1999, IEEE International Conference on Systems, Man, and Cybernetics, vol. 5, pp. 1066-1069.

(56) References Cited

OTHER PUBLICATIONS

R. Azuma, A Survey of Augmented Reality in Presence; Teleoperators and Virtual Environments 6. 4, 355-385, (1997).
R. Kijima, K. Haza, Y. Tada, and T. Ojika, "Distributed display approach using PHMD with infrared camera," in Proceedings of IEEE 2002 Virtual Reality Annual International Symposium (IEEE, 2002), pp. 1-8.
R. Kijima and T. Ojika, "Transition between virtual environment and workstation environment with projective headmounted display," in Proceedings of IEEE VR 1997 (IEEE, 1997), pp. 130-137.
R. Martins, V. Shaoulov, Y. Ha, and J. P. Rolland, "Projection based head-mounted displays for wearable computers," Proc. SPIE 5442, 104-110 (2004).
R. N. Berry, L. A. Riggs, and C. P. Duncan, "The relation of vernier and depth discriminations to field brightness," J. Exp. Psychol. 40, 349-354 (1950).
Rolland, J.P., et al., 'Optical versus video see-through head mounted displays in medical visualization', Presence' Teleoperators and Virtual Environments 9, 287-309 (2000).
Winterbottom, M., et al., 'Helmet-Mounted Displays for use in Air Force Training and Simulation', Human Effectiveness Directorate, Nov. 2005, pp. 1-54.
Written Opinion of the International Searching Authority dated Mar. 9, 2009 with regard to International Patent Application No. PCT/US2009/031606.
Y. Ha, H. Hua, R. Martins, and J. P. Rolland, "Design of a wearable wide-angle projection color display," in Proceedings of International Optical Design Conference 2002 (IODC, 2002), pp. 67-73.
Zhang, R., "8.3: Design of a Compact Light Engine for FLCOS Microdisplays in a p-HMPD system", Society for Information Display 2008 International Symposium, Seminar and Exhibition (SID2008), Los Angeles, CA, May 2008.
Zhang, R., et al., "Design of a Polarized Head-Mounted Projection Display Using Ferroelectric Liquid-Crystal-on-Silicon Microdisplays", Applied Optics, vol. 47, No. 15, May 20, 2008, pp. 2888-2896.
Zhang, R., et al., "Design of a Polarized Head-Mounted Projection Display using FLCOS Microdisplays", Proc. of SPIE vol. 6489, 64890B-1. (2007).
"OLED-XL Microdisplays," eMagin 5 pages (2010).
A. Jones, I. McDowall, Yamada H., M. Bolas, P. Debevec, Rendering for an Interactive 360° Light Field Display ACM Transactions on Graphics (TOG)—Proceedings of ACM SIGGRAPH 2007, 26(3), 2007.
A. Malmone, and H. Fuchs, "Computational augmented reality eyeglasses," Proc. of ISMAR 2012.
A. Castro, Y. Frauel, and B. Javidi, "Integral imaging with large depth of field using an asymmetric phase mask," Journal of Optics Express, vol. 15, Issue 16, pp. 10266-10273 (Aug. 2007).
A. T. Duchowski, "Incorporating the viewer's Point-Of-Regard (POR) in gaze-contingent virtual environments", SPIE-Int. Soc. Opt. Eng. Proceedings of Spie—the International Society for Optical Engineering, vol. 3295, 1998, pp. 332-343.
Akeley et al., "A Stereo Display Prototype with Multiple Focal Distances," ACM Trans. Graphics 23:804-813 (2004).
Blundell, B. G., and Schwarz, A. J., "The classification of volumetric display systems: characteristics and predictability of the image space," IEEE Transaction on Visualization and Computer Graphics, 8(1), pp. 66-75, 2002.
C. B. Burckhardt, "Optimum parameters and resolution limitation of integral photography," J. Opt. Soc. Am. 58, 71-76 (1968).
C. Manh Do, R. Mart☐ ñ-ez-Cuenca, and B. Javidi, "Three-dimensional object-distortion-tolerant recognition for integral imaging using independent component analysis," Journal of Optical Society of America A 26, issue 2, pp. 245-251 (Feb. 1, 2009).
Chih-Wei Chen, Myungjin Cho, Yi-Pai Huang, and Bahram Javidi, "Improved viewing zones for projection type integral imaging 3D display using adaptive liquid crystal prism array," IEEE Journal of Display Technology, 2014.

Christopher M. Bishop, Neural Networks for Pattern Recognition, Oxford University Press, Inc. New York, NY 1995.
Curatu, C., J.P. Rolland, and Hong Hua, "Dual purpose lens for an eye-tracked projection head-mounted display," Proceedings of International Optical Design Conference, Vancouver, Canada, Jun. 2006.
D. Cheng, Y.Wang, H. Hua, and M. M. Talha, Design of an optical see-through headmounted display with a low f-number and large field of view using a free-form prism, App. Opt. 48 (14), pp. 2655-2668, 2009.
D. Cheng, Y. Wang, H. Hua, and M. M. Talha, "Design of an optical see-through head-mounted display with a low f-number and large field of view using a freeform prism," Appl. Opt., 48(14):2655-2668, 2009.
D. Cheng, Y. Wang, H. Hua, J. Sasian, "Design of a wide-angle, lightweight head-mounted display using free-form optics tiling," Opt. Lett., 36(11):2098-100, 2011.
D.M. Hoffman, A.R. Girshick, K. Akeley, and M.S. Banks, "Vergence-Accommodation Conflicts Hinder Visual Performance and Cause Visual Fatigue," J. Vision, 8(3), 1-30, (2008).
Davis et al., "Accommodation to Large Disparity Stereograms," Journal of AAPOS 6:377-384 (2002).
Downing et al., "A Three-Color, Solid-State, Three-Dimensional Display," Science 273:1185-1189 (1996).
Duchowski, A., "Eyetracking Methodology: theory and practice," Publisher: Springer, 2003.
Duchowski, A.T., and A. Coltekin, "Foveated gaze-contingent displays for peripheral LOD management, 3D visualization, and stereo imaging," ACM Trans. on Mult. Comp., Comm., and App. 3, 1-21, (2007).
Edgar et al., "Visual Accommodation Problems with Head-Up and Helmet-Mounted Displays?," Displays 15:68-75 (1994).
European Search Report dated Aug. 14, 2015 in corresponding EP application 13740989.2.
F. Okano, H. Hoshino, J. Arai y I. Yuyama, "Real-time pickup method for a three-dimensional image based on integral photography," Appl. Opt. 36, 1598-1603 (1997).
Favalora et al., "100 Million-Voxel Volumetric Display," Proc. SPIE 4712:300-312 (2002).
G. Wetzstein et al., "Tensor Displays: Compressive light field synthesis using multilayer displays with directional backlighting," ACM Transactions on Graphics, 31(4), 2012.
GB Examination Report corresponding to GB 1012165.5 dated Jun. 28, 2011.
Geisler, W.S., J.S. Perry and J. Najemnik, "Visual search: The role of peripheral information measured using gaze-contingent displays," J. Vision 6, 858-873 (2006).
Graham-Rowe, "Liquid Lenses Make a Splash," Nature-Photonics pp. 2-4 (2006).
H. Hua, X. Hu, and C. Gao, "A high-resolution optical see-through head-mounted display with eyetracking capability," Optics Express, Nov. 2013.
H. Hua, "Sunglass-like displays become a reality with freeform optical technology," SPIE Newsroom, 2012.
H. Mukawa, K. Akutsu, I. Matsumura, S. Nakano, T. Yoshida, M. Kuwahara, and K. Aiki, A full-color eyewear display using planar waveguides with reflection volume holograms, J. Soc. Inf. Display 19 (3), pp. 185-193, 2009.
H. Hoshi, N. Taniguchi, H. Morishima, T. Akiyama, S. Yamazaki and A. Okuyama, "Off-axial HMD optical system consisting of aspherical surfaces without rotational symmetry," SPIE vol. 2653, 234 (1996).
H. Hua, C. Pansing, and J.P. Rolland, "Modeling of an eye-imaging system for optimizing illumination schemes in an eye-tracked head-mounted display," Appl. Opt., 46(31):7757-75, Oct. 2007.
H. Hua, P. Krishnaswamy, and J.P. Rolland, 'Video-based eyetracking methods and algorithms in head-mounted displays,' Opt. Express, 14(10):4328-50, May 2006.
Heanue et al., "Volume Holographic Storage and Retrieval of Digital Data," Science 265:749-752 (1994).
Hidenori Kuriyabashi, Munekazu Date, Shiro Suyama, Toyohiko HatadaJ. of the SID 14/5, 2006 pp. 493-498.
Hua, "Merging the Worlds of Atoms and Bits: Augmented Virtual Environments," Optics and Photonics News 17:26-33 (2006).

(56) References Cited

OTHER PUBLICATIONS

Hua, H., C. Pansing, and J. P. Rolland, "Modeling of an eye-imaging system for optimizing illumination schemes in an eye-tracked head-mounted display," Applied Optics, 46(32): 1-14, Nov. 2007.
Hua, H. "Integration of eye tracking capability into optical see-through head-mounted displays," Proceedings of SPIE (Electronic Imaging 2001), pp. 496-503, Jan. 2001.
Hua et al, "Compact eyetracked optical see-through head-mounted display", Proc. SPIE 8288, Stereoscopic Displays and Applications XXIII, 82881F (Feb. 9, 2012).
Inoue et al., "Accommodative Responses to Stereoscopic Three-Dimensional Display," Applied Optics, 36:4509-4515 (1997).
International Search Report and Written Opinion dated Nov. 24, 2015 in corresponding PCT application PCT/US2015/047163.
International Search Report dated Feb. 10, 2011 from PCT/CN2010/072376.
International Search Report dated Jan. 29, 2014 in corresponding international application PCT/US2013/065422.
International Search Report dated Jun. 18, 2010 in corresponding international application PCT/US2010/031799.
J. Hong, S. Min, and B. Lee, "Integral floating display systems for augmented reality," Applixed Optics, 51(18):4201-9, 2012.
J. S. Jang and B. Javidi, "Large depth-of-focus time-multiplexed three-dimensional integral imaging by use of lenslets with non-uniform focal lengths and aperture sizes," Opt. Lett. vol. 28, pp. 1924-1926 (2003).
J. Arai, et al., "Depth-control method for integral imaging," Feb. 1, 2008 / vol. 33, No. 3 / Optics Letters.
J. E. Melzer'S: 'Overcoming the field-of-view/resolution invariant in head-mounted displays' Proc. SPIE vol. 3362, 1998, p. 284.
J. G. Droessler, D. J. Rotier, "Tilted cat helmet-mounted display," Opt. Eng., vol. 29, 849 (1990).
J. P. Rolland, "Wide-angle, off-axis, see-through head-mounted display," Opt. Eng., vol. 39, 1760 (2000).
J. S. Jang, F. Jin, and B. Javidi, "Three-dimensional integral imaging with large depth of focus by use of real and virtual image fields," Opt. Lett. 28:1421-23, 2003.
J. Y. Son, W.H. Son, S.K. Kim, K.H. Lee, B. Javidi, "Three-Dimensional Imaging for Creating Real-World-Like Environments," Proceedings of IEEE Journal, vol. 101, issue 1, pp. 190-205, Jan. 2013.
Jisoo Hong, et al., "Three-dimensional display technologies of recent interest: Principles, Status, and Issues," Applied Optics (Dec. 1, 2011) 50(34):106.
K. Iwamoto, K. Tanie, T. T. Maeda, "A head-mounted eye movement tracking display and its image display method", Systems & Computers in Japan, vol. 28, No. 7, Jun. 30, 1997, pp. 89-99. Publisher: Scripta Technica, USA.
K. Iwamoto, S. Katsumata, K. Tanie, "An eye movement tracking type head mounted display for virtual reality system:—evaluation experiments of a prototype system", Proceedings of 1994 IEEE International Conference on Systems, Man, and Cybernetics. Humans, Information and Technology (Cat. No. 94CH3571-5). IEEE. Part vol. 1, 1994, pp. 13-18 vol. 1. New York, NY, USA.
Kuiper et al., "Variable-Focus Liquid Lens for Miniature Cameras," Applied Physics Letters 85:1128-1130 (2004).
Kuribayashi, et al., "A Method for Reproducing Apparent Continuous Depth in a Stereoscopic Display Using "Depth-Fused 3D" Technology" Journal of the Society for Information Display 14:493-498 (2006).
L. G. Brown's: 'Applications of the Sensics panoramic HMD' SID Symposium Digest vol. 39, 2008, p. 77.
Laurence R. Young, David Sheena, "Survey of eye movement recording methods", Behavior Research Methods & Instrumentation, 7(5), 397-429, 1975.
Liu et al., 'A Novel Prototype for an Optical See-Through Head-Mounted Display with Addressable Focus Cues,' IEEE Transactions on Visualization and Computer Graphics 16:381-393 (2010).

Liu et al., "A Systematic Method for Designing Depth-Fused Multi-Focal Plane Three-Dimensional Displays," Optics Express 18:11562-11573 (2010).
Liu et al., "An Optical See-Through head Mounted Display with Addressable Focal Planes," IEEE Computer Society, pp. 33-42 (2008).
Liu et al., "Time-Multiplexed Dual-Focal Plane Head-Mounted Display with a Liquid Lens," Optics Letters 34:1642-1644 (2009).
Loschky, L.C. and Wolverton, G.S., "How late can you update gaze-contingent multiresolutional displays without detection?" ACM Trans. Mult. Comp. Comm. and App. Nov. 3, 2007.
Love et al. (High Speed switchable lens enables the development of a volumetric stereoscopic display. Aug. 2009, Optics Express. vol. 17, No. 18, pp. 15716-15725.).
M. Marti-nez-Corral, H. Navarro, R. Mart☐ ñ-ez-Cuenca, G. Saavedra, and B. Javidi, "Full parallax 3-D TV with programmable display parameters," Opt. Phot. News 22, 50-50 (2011).
M. D. Missig and G. M. Morris, "Diffractive optics applied to eyepiece design," Appl. Opt. 34, 2452-2461 (1995).
M. Daneshpanah, B. Javidi, and E. Watson, "Three dimensional integral imaging with randomly distributed sensors," Journal of Optics Express, vol. 16, Issue 9, pp. 6368-6377, Apr. 21, 2008.
M. Gutin: 'Automated design and fabrication of ocular optics' Proc. SPIE 2008, p. 7060.
M. L. Thomas, W. P. Siegmund, S. E. Antos, and R. M. Robinson, "Fiber optic development for use on the fiber optic helmet-mounted display", Helmet-Mounted Displays, J. T. Carollo, ed., Proc. SPIE 116, 90-101, 1989.
M. Lucente, "Interactive three-dimensional holographic displays: seeing the future in depth," Computer Graphics, 31(2), pp. 63-67, 1997.
McQuaide et al., "A Retinal Scanning Display System That Produces Multiple Focal Planes with a Deformable Membrane Mirror," Displays 24:65-72 (2003).
Mon-Williams et al., "Binocular Vision in a Virtual World: Visual Deficits Following the Wearing of a Head-Mounted Display," Ophthalmic Physiol. Opt. 13:387-391 (1993).
O. Cakmakci, B. Moore, H. Foroosh, and J. P. Rolland, "Optimal local shape description for rotationally non-symmetric optical surface design and analysis," Opt. Express 16, 1583-1589 (2008).
Optical Research Associates, http://www.optica1res.com, 2 pages (obtained Jan. 26, 2011).
P. A. Blanche, et al, "Holographic three-dimensional telepresence using large-area photorefractive polymer", Nature, 468, 80-83, Nov. 2010.
P. Gabbur, H. Hua, and K. Barnard, 'A fast connected components labeling algorithm for real-time pupil detection,' Mach. Vision Appl., 21(5):779-787, 2010.
R. MartÃ? Â -nez-Cuenca, H. Navarro, G. Saavedra, B. Javidi, and M. Martinez-Corral, "Enhanced viewing-angle integral imaging by multiple-axis telecentric relay system," Optics Express, vol. 15, Issue 24, pp. 16255-16260, Nov. 21, 2007.
R. Schulein, C. Do, and B. Javidi, "Distortion-tolerant 3D recognition of underwater objects using neural networks," Journal of Optical Society of America A, vol. 27, No. 3, pp. 461-468, Mar. 2010.
R. Schulein, M. DaneshPanah, and B. Javidi, "3D imaging with axially distributed sensing," Journal of Optics Letters, vol. 34, Issue 13, pp. 2012-2014, Jul. 1, 2009.
R.J. Jacob, "The use of eye movements in human-computer interaction techniques: what you look at is what you get", ACM Transactions on Information Systems, 9(2), 152-69, 1991.
Reingold, E.M., L.C. Loschky, G.W. McConkie and D.M. Stampe, "Gaze-contingent multiresolutional displays: An integrative review," Hum. Factors 45, 307-328 (2003).
Rolland, J. P., A. Yoshida, L. D. Davis and J. H. Reif, "High-resolution inset head-mounted display," Appl. Opt. 37, 4183-93 (1998).
Rolland et al., "Multifocal Planes Head-Mounted Displays," Applied Optics 39:3209-3215 (2000).

(56) References Cited

OTHER PUBLICATIONS

S. Bagheri and B. Javidi, "Extension of Depth of Field Using Amplitude and Phase Modulation of the Pupil Function," Journal of Optics Letters, vol. 33, No. 7, pp. 757-759, Apr. 1, 2008.
S. Hong, J. Jang, and B. Javidi, "Three-dimensional volumetric object reconstruction using computational integral imaging," Journal of Optics Express, on-line Journal of the Optical Society of America, vol. 12, No. 3, pp. 483-491, Feb. 9, 2004.
S. Hong and B. Javidi, "Distortion-tolerant 3D recognition of occluded objects using computational integral imaging," Journal of Optics Express, vol. 14, Issue 25, pp. 12085-12095, Dec. 11, 2006.
S. Kishk and B. Javidi, "Improved Resolution 3D Object Sensing and Recognition using time multiplexed Computational Integral Imaging," Optics Express, on-line Journal of the Optical Society of America, vol. 11, No. 26, pp. 3528-3541, Dec. 29, 2003.
Schowengerdt, B. T., and Seibel, E. J., "True 3-D scanned voxel displays using single or multiple light sources," Journal of SID, 14(2), pp. 135-143, 2006.
Schowengerdt et al., "True 3-D Scanned Voxel Displays Using Single or Multiple Light Sources," J. Soc. Info. Display 14:135-143 (2006).
Sheedy et al., "Performance and Comfort on Near-Eye Computer Displays," Optometry and Vision Science 79:306-312 (2002).
Shibata et al., "Stereoscopic 3-D Display with Optical Correction for the Reduction of the Discrepancy Between Accommodation and Convergence," Journal of the Society for Information Display 13:665-671 (2005).
Shiwa et al., "Proposal for a 3-D Display with Accommodative Compensation: 3DDAC," Journal of the Society for Information Display 4:255-261 (1996).
Sullivan, "A Solid-State Multi-Planar Volumetric Display," SID Symposium Digest of Technical Papers 34:354-356 (2003).
Suyama, S., Ohtsuka, S., Takada, H., Uehira, K., and Sakai, S., "Apparent 3D image perceived from luminance-modulated two 2D images displayed at different depths," Vision Research, 44: 785-793, 2004.
T. Okoshi, "Optimum design and depth resolution of lens-sheet and projection-type three-dimensional displays," Appl. Opt. 10, 2284-2291 (1971).
T. Ando, K. Yamasaki, M. Okamoto, and E. Shimizu, "Head Mounted Display using holographic optical element," Proc. SPIE, vol. 3293, 183 (1998).
Tibor Balogh, "The HoloVizio System," Proceedings of SPIE, VOl 6055, 2006.
Varioptic, "Video Auto Focus and Optical Image Stabilization," http://vvww.varioptic.com/en/home.html, 2 pages (2008).
Wann et al., Natural Problems for Stereoscopic Depth Perception in Virtual Environments, Vision Res. 35:2731-2736 (1995).
Wartenberg, Philipp, "EyeCatcher, the Bi-directional OLED Microdisplay," Proc. of SID 2011.
Watt et al., "Focus Cues Affect Perceived Depth," J Vision 5:834-862 (2005).
Written Opinion dated Feb. 10, 2011 from PCT/CN2010/072376.
Written Opinion dated Jun. 18, 2010 in corresponding international application PCT/US2010/031799.
X. Hu and H. Hua, "Design and assessment of a depth-fused multi-focal-plane display prototype," Journal of Display Technology, Dec. 2013.
Xiao Xiao, Bahram Javidi, Manuel Martinez-Corral, and Adrian Stern, "Advances in Three-Dimensional Integral Imaging: Sensing, Display, and Applications," Applied Optics, 52(4):. 546-560,2013.
Xin Shen, Yu-Jen Wang, Hung-Shan Chen, Xiao Xiao, Yi-Hsin Lin, and Bahram Javidi, "Extended depth-of-focus 3D micro integral imaging display using a bifocal liquid crystal lens," Optics Letters, vol. 40, issue 4, pp. 538-541 (Feb. 9, 2015).
Xinda Hu and Hong Hua, "High-resolution optical see-through multi-focal-plane head-mounted display using freeform optics," Optics Express,22(11): 13896-13903, Jun. 2014.

Y. Takaki, Y. Urano, S. Kashiwada, H. Ando, and K. Nakamura, "Super multi-view winshield display for long-distance image information presentation," Opt. Express, 19, 704-16, 2011.
Yamazaki et al, "Thin wide-field-of-view HMD with free-form-surface prism and applications", Proc. SPIE 3639, Stereoscopic Displays and Virtual Reality Systems VI, 453 (May 24, 1999).
Yano, S., Emoto, M., Mitsuhashi, T., and Thwaites, H., "A study of visual fatigue and visual comfort for 3D HDTV/HDTV images," Displays, 23(4), pp. 191-201, 2002.
Xin et al., "Design of Secondary Optics for IRED in active night vision systems," Jan. 10, 2013, vol. 21, No. 1, Optics Express, pp. 1113-1120.
S. Nikzad, Q. Yu, A. L. Smith, T. J. Jones, T. A. Tombrello, S. T. Elliott, "Direct detection and imaging of low-energy electrons with delta-doped charge-coupled devices," Applied Physics Letters, vol. 73, p. 3417, 1998.
European Search Report dated Apr. 28, 2016 from EP application 13847218.8.
Xinda Hu et al: "48.1: Distinguished Student Paper: A Depth-Fused Multi-Focal-Plane Display Prototype Enabling Focus Cues in StereoscopicDisplays", SID International Symposium. Digest of Technical Papers, vol. 42, No. I, Jun. 1, 2011 (Jun. 1, 2011), pp. 691-694, XP055266326.
Hu and Hua, "Design and tolerance of a freeform optical system for an optical see-through multi-focal plane display," Applied Optics, 2015.
A. Yabe, "Representation of freeform surface suitable for optimization," Applied Optics, 2012.
Armitage, David, Ian Underwood, and Shin-Tson Wu. Introduction to Microdisplays. Chichester, England: Wiley, 2006.
Hoshi, et al, "Off-axial HMD optical system consisting of aspherical surfaces without rotational symmetry," Proc. SPIE 2653, Stereoscopic Displays and Virtual Reality Systems III, 234 (Apr. 10, 1996).
S. Feiner, 2002, "Augmented reality: A new way of seeing," Scientific American, No. 54, 2002.
K. Ukai and P.A. Howardth, "Visual fatigue caused by viewing stereoscopic motion images: background, theories, and observations," Displays, 29(2), pp. 106-116, 2008.
B. T. Schowengerdt, M. Murari, E. J. Seibel, "Volumetric display using scanned fiber array," SID Symposium Digest of Technical Papers, 2010.
H. Hua and B. Javidi, "A 3D integral imaging optical see-through head-mounted display", Optics Express, 22(11): 13484-13491, 2014.
W. Song, Y. Wang. D. Cheng, Y. Liu, "Light field head-mounted display with correct focus cue using micro structure array," Chinese Optics Letters, 12(6): 060010, 2014.
T. Peterka, R. Kooima, D. Sandin, A. Johnson, J. Leigh, T. DeFanti, "Advances in the Dynallax solid-state dynamic parallax barrier autostereoscopi visualization display system," IEEE Trans. Visua. Comp. Graphics, 14(3): 487-499, 2008.
Hu, X., Development of the Depth-Fused Multi-Focal Plane Display Technology, Ph.D. Dissertation, College of Optical Sciences, University of Arizona, 2014.
S. Ravikumar, K. Akeley, and M. S. Banks, "Creating effective focus cues in multi-plane 3D displays," Opt. Express 19, 20940-20952, 2011.
X. Hu and H. Hua, "Design and tolerance of a free-form optical system for an optical see-hrough multi-focal-plane display," Applied Optics, 54(33): 9990-9, 2015.
Dewen Cheng et al.; "Large field-of-view and high resolution free-form head-mounted display"; SPIE-OSA/ vol. 7652 Jun. 2018.
Huang et al., "An integral-imaging-based head-mounted light field display using a tunable lens ,;1nd aperture array." Journal of the Society for Information Display Mar. 1, 2017; p. 199-201.
G. Lippmann, "Epreuves reversibles donnant la sensation du relief," Journal of Physics (Paris) 7, 821-825 (1908).
Full Certified Translation of Reference JP008160345.
Full Certified Translation of Reference JP 02200074.
Cheol-Joong Kim et al, "Depth plane adaptive integral imaging using a varifocal liquid lens array", Applied Optics, OSA, vol. 54, No. 10, Apr. 1, 2015 (Apr. 1, 2015), pp. 2565-2571.

(56) References Cited

OTHER PUBLICATIONS

Xin Shen et al: "Large depth of focus dynamic micro integral imaging for optical see-through augmented reality display using a focus-tunable lens", Applied Optics, vol. 57, No. 7, Mar. 1, 2018 (Mar. 1, 2018), p. B184.

Martinez-Cuenca R et al: "Progress in 3-D Multiperspective Display by Integral Imaging", Proceedings of the IEEE, IEEE. New York, us, vol. 97, No. 6, Jun. 1, 2009 (Jun. 1, 2009), pp. 1067-1077.

Kim Cheoljoong et al: "Depth-enhanced integral imaging display system with time-multiplexed depth planes using a varifocal liquid lens array", Proceedings of SPIE, IEEE, US, vol. 9385, Mar. 11, 2015 (Mar. 11, 2015), pp. 93850D-93850D.

Huan Deng et al: "The Realization of Computer Generated Integral Imaging Based on Two Step Pickup Method", Photonics and Optoelectronic (SOPO), 2010 Symposium on, IEEE, Piscataway, NJ, USA, Jun. 19, 2010 (Jun. 19, 2010), pp. 1-3.

H. Hua, "Enabling focus cues in head-mounted displays," Proceedings of the IEEE 105(5), 805-824 (2017).

G. E. Favalora, "Volumetric 3D displays and application infrastructure," Computer, 38(8), 37-44 (2005).

H. Yu, K. Lee, J. Park, and Y. Park, "Ultrahigh-definition dynamic 3D holographic display by active control of vol. speckle fields," Nature Photonics 11(3), 186 (2017).

G. Li, D. Lee, Y. Jeong, J. Cho, and B. Lee, "Holographic display for see-through augmented reality using mirror-lens holographic optical element," Opt. Letters 41(11), 2486-2489 (2016).

S. B. Kim and J. H. Park, "Optical see-through Maxwellian near-to-eye display with an enlarged eyebox," Opt. Letters 43(4), 767-770 (2018).

D. Lanman and D. Luebke, "Near-eye light field displays," ACM Trans. Graph. 32(6), 1-10 (2013).

H. Huang and H. Hua, "High-performance integral-imaging-based light field augmented reality display using freeform optics," Opt. Express 26(13), 17578-17590 (2018).

B. Liu, X. Sang, X. Yu, X. Gao, L. Liu, C. Gao, p. Wang, Y. Le, and J. Du, "Time-multiplexed light field display with 120-degree wide viewing angle". Opt. Express 27(24), p. 35728-35739 (2019).

H. Huang and H. Hua, "Generalized methods and strategies for modeling and optimizing the optics of 3D head-mounted light field displays," Opt. Express 27(18), 25154-25171 (2019).

H. Huang and H. Hua, "Systematic characterization and optimization of 3D light field displays," Opt. Express 25(16), 18508-18525 (2017).

J. H. Park, S. W. Min, S. Jung, and B. Lee. "Analysis of viewing parameters for two display methods based on integral photography." Applied Optics 40, No. 29 5217-5232 (2001).

X. Wang, Y. Qin, H. Hua, Y. H. Lee, and S. T. Wu. "Digitally switchable multi-focal lens using freeform optics." Opt. Express 16;26(8):11007-17(2018).

X. Wang, and H. Hua. "Digitally Switchable Micro Lens Array for Integral Imaging." SID Symposium Digest of Technical Papers. Vol. 51. No. 1. (2020).

M. Xu and H. Hua, "Finite-depth and varifocal head-mounted display based on geometrical lightguide," Opt. Express 28(8), 12121-12137 (2020).

Jason Geng: "Three-dimensional display technologies", Advances in Optics and Photonics, vol. 5, No. 4, Nov. 22, 2013 (2013-11-22), pp. 456-535,.

\* cited by examiner

HEAD-MOUNTED PROJECTION DISPLAY USING REFLECTIVE MICRODISPLAYS

RELATED APPLICATIONS

This application is a continuation application of U.S. application Ser. No. 16/170,860 filed on, Oct. 25, 2018, which is a continuation application of U.S. application Ser. No. 15/092,831 filed on, Apr. 7, 2016, which is a continuation application of U.S. application Ser. No. 13/955,076 filed on, Jul. 31, 2013, which is divisional application of U.S. application Ser. No. 12/863,771 filed on Oct. 29, 2010, which is a 371 application of International Application No. PCT/US2009/31606 filed Jan. 21, 2009, which claims the benefit of priority of U.S. Provisional Application No. 61/011,789, filed on Jan. 22, 2008, the entire contents of which applications are incorporated herein by reference.

GOVERNMENT RIGHTS

This invention was made with government support under Grant No. IIS0534777 awarded by NSF. The government has certain rights in the invention.

FIELD OF THE INVENTION

The present invention relates generally to a head-mounted projection display, and more particularly, but not exclusively to a polarized head-mounted projection display including a light engine and a compact, high-performance projection lens for use with reflective microdisplays.

BACKGROUND OF THE INVENTION

The head mounted projection display (HMPD), as an alternative to the conventional eyepiece-based head mounted display (HMD), has attracted much interest in recent years, because it offers the ability to design a wide field of view (FOV), low distortion and ergonomically compact optical see-through head mounted display (OST-HMD). Like most OST-HMDs, however, one of the limiting factors for the HMPD technology is its low image brightness and contrast, which limits the feasibility to apply such information to outdoor or well-lit indoor environments such as operating rooms. Due to the multiple beamsplitting through a beamsplitter and low retroreflectivity of typical retroreflective materials, the overall efficiency of a HMPD is around 4%. For instance, with a miniature backlit active matrix liquid crystal display (AMLCD) as the image source, the luminance of the observed image is estimated to be 4 $cd/m^2$, while the average luminance of a well-lit indoor environment is over 100 $cd/m^2$. As a result, the low-brightness image of HMPDs will appear washed out in such well-lit environments. In fact, most optical see-through HMDs, including HMPD, are typically operated under a dimmed lighting condition.

To address this problem, a polarized head-mounted projection display (p-HMPD) was proposed (H. Hua and C. Gao, "A polarized head-mounted projective displays," *Proceedings of* 2005 *IEEE and ACM International Symposium on Mixed and Augmented Reality*, pp. 32-35, October 2005) and a prototype based on a pair of transmissive AMLCDs was designed recently (H. Hua, C. Gao "Design of a bright polarized head-mounted projection display" *Applied Optics*, Vol. 46, Issue 14, pp. 2600-2610, May 2007). A pair of 1.3" color AMLCDs was used as the image sources which have a resolution of (640*3)*480 pixels. 1.4" Alphalight™ RGB LED panels (Teledyne Inc., Los Angeles, Calif.) were used as the backlighting sources. By carefully manipulating the polarization states of the light propagating through the system, a p-HMPD can potentially be three times brighter than a traditional non-polarized HMPD design using the same microdisplay technologies. A schematic design of a monocular p-HMPD configuration is illustrated in FIG. 1.

The image on the LCD display is projected through the projection lens, forming a real intermediate image. The light from the LCD is manipulated to be S-polarized so that its polarization direction is matched with the high-reflection axis of the polarized beamsplitter (PBS). After the projected light is reflected by the PBS, it is retroreflected back to the same PBS by a retroreflective screen. The depolarization effect by the retroreflective screen is less than 10% within ±20 degrees and is less than 20% up to ±30 degrees. As a result, the retroreflected light remains dominantly the same polarization as its incidence light. In order to achieve high transmission through the PBS after the light is retroreflected back, a quarter-wave retarder is placed between the PBS and the retroreflective screen. By passing through the quarter wave retarder twice, the incident S-polarized light is converted to P-polarization and transmits through the PBS with high efficiency. Thus the projected image from the microdisplay can be then observed at the exit pupil of the system where the eye is placed.

However, since a transmissive LCD microdisplay has a low transmission efficiency of around 5%, the overall performance of the first p-HMPD prototype is still unsatisfactory in a well-lit environment. Furthermore, owing to its inherent low pixel fill factor, a transmissive AMLCD microdisplay typically has a relatively low resolution. Accordingly, it would be an advance in the field of head-mounted projection displays to provide a head-mounted projection display which has higher luminance while maintaining high contrast.

SUMMARY OF THE INVENTION

In one of its aspects, the present invention provides a compact, telecentric projection lens for use in a head-mounted projection display system. The projection lens may include a plurality of lens elements configured to have an overall length that is no more than about two times the effective focal length of the projection lens. In addition, the plurality of lens elements may be configured so that the projection lens is telecentric in image space. As one measure of the compactness the projection lens may have an overall length that is no more than about 85% larger than the effective focal length of the projection lens. Further, the projection lens may have a back focal length that is about 40% larger than the effective focal length. To further facilitate the use of the projection lens in a head-mounted display, the projection lens may also be lightweight and have a ratio of the weight of the projection lens to the square of the F-number of the projection lens of less than about 2 to 1. For example, in one configuration the present invention provides a projection lens with a F-number of 2.1 and a weight of only 8.2 g.

In another of its aspects the present invention provides a telecentric optical illumination system for use with a reflective microdisplay. The illumination system may include a source of optical radiation having a first polarization state and a polarized beamsplitter disposed at a location to receive optical radiation from the optical radiation source. The beamsplitter may further be oriented relative to the source of optical radiation to reflect the received optical radiation. In addition, the illumination system may include an optical retarder disposed at a location relative to the beamsplitter to receive optical radiation reflected by the beamsplitter and oriented to convert the polarization state of the received optical radiation to be circularly polarized. A reflector having optical power may also be disposed at a location to receive the circularly polarized optical radiation from the optical retarder and to reflect the received optical radiation back through the retarder and beamsplitter. The reflector may be a concave spherical reflector. Still further, in order to provide an optical illumination system that is telecentric in image space, the illumination system may include a pupil disposed at the source of optical radiation.

In yet another of its aspects, the present invention provides a head-mounted projection display system which may include the aforementioned illumination system, a microdisplay disposed one reflector focal length away from the reflector for receiving optical radiation from the reflector, and a telecentric projection lens. The projection lens may assume the configuration of the aforementioned projection lens.

BRIEF DESCRIPTION OF THE DRAWINGS

The foregoing summary and the following detailed description of the preferred embodiments of the present invention will be best understood when read in conjunction with the appended drawings, in which.

DETAILED DESCRIPTION

Figure 3:
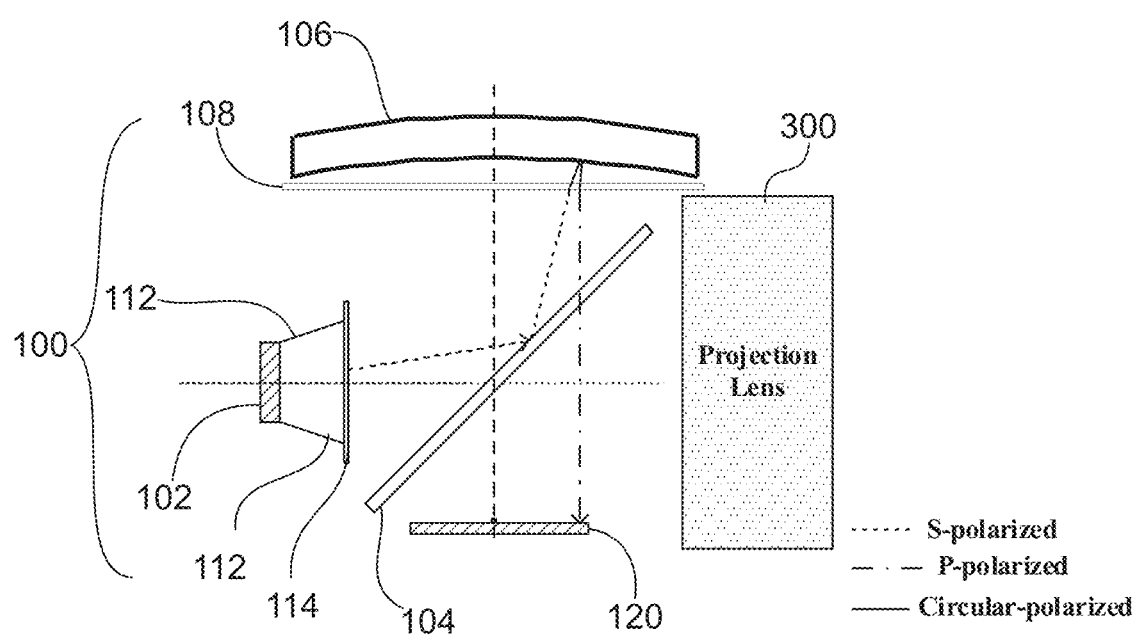
FIG. 3 schematically illustrates an exemplary design of a light engine in accordance with the present invention.

In order to realize the above-mentioned benefits afforded by a reflective microdisplay 120 in the context of a head-mounted projection display, suitable optical designs are required for both a light engine 100, to deliver uniform, telecentric illumination to the microdisplay 120, and for a telecentric projection lens 300 to collect the light reflected by the microdisplay 120 for delivery to the user, FIG. 3. In addition to the requirements of telecentricity and uniformity, the light engine 100 and projection lens 300 must be sufficiently compact and lightweight to permit their use as part of the head-mounted system. In this regard, in one of its aspects, the present invention provides a compact, telecentric light engine 100 that includes a light pipe 110 and polarization manipulating components 104, 108 to increase the overall uniformity and brightness, respectively, of the light delivered to a reflective microdisplay 120, FIG. 3. In another of its aspects, the present invention provides a telecentric projection lens 300 comprising all plastic components having aspheric surfaces and a diffractive optical element to yield a lens 300 that is simultaneously compact, telecentric, and lightweight, FIG. 10. Together, the light engine 100, reflective microdisplay 120, and projection lens 300 provide a polarized HMPD in accordance with the present invention, FIG. 14.

Turning now to the overall system, design began by selection of an exemplary microdisplay 120 from which the performance requirements of both the light engine 100 and projection lens 300 may be derived. Major properties of several candidate microdisplay technologies were evaluated, including AMLCD, organic light emitting displays (OLEDs), liquid crystal on silicon (LCOS), and ferroelectric Liquid-crystal-on-Silicon (FLCOS) were considered. For use in the examples provided below, the SXGA-R2D FLCOS microdisplay kit (Forth Dimensional Displays Limited, Birmingham, UK) was selected as an exemplary microdisplay for use in the present invention due to its high resolution, optical efficiency, and compactness. However, though a FLCOS microdisplay is used for illustrative purposes in the designs presented below, it is understood that the present invention is not limited to such a microdisplay, but may be used in conjunction with suitable other displays, such as, reflective microdisplay types like LCOS, MEMS, Texas Instruments DLP, and so forth, for example.

The usage of a FLCOS microdisplay 120 makes the prototype design of a HMPD quite different from previous designs of HMPD optics. One of the key differences is the requirement for the custom-designed light engine 100 to illuminate the microdisplay 120. The FLCOS microdisplay 120 is considered as the combination of a mirror and an electrically switchable quarter-wave retarder formed by the liquid crystal layers. The FLCOS microdisplay 120 works most efficiently when the illumination rays are normally incident upon the display surface. To ensure the high contrast of the output image, it is recommended to limit the incident angle to the range of ±16 degrees, which imposes a critical requirement on the design of both the light engine 100 and projection lens 300. The key requirements for the light engine 100 include: (1) that the illumination system be image-space telecentric to ensure that for every pixel on the display surface the incident chief ray is normal to the display surface; and (2) that the cone angle of the ray bundle is smaller than 16 degrees.

Likewise, owing to the reflective nature of the microdisplay 120, the output ray bundles from every pixel of the microdisplay 120 are telecentric with a cone angle smaller than 16 degrees. To efficiently collect rays from the microdisplay 120 and form a projected image with uniform illumination, the projection lens 300 must be image-space telecentric. To the contrary, a projection system using backlit AMLCDs, which have a relatively large viewing angle, and thus relaxed requirement for the angle of incidence ray bundles, can relax the telecentric constraint to gain compactness.

TABLE 1

Specification of microdisplay and LED panel

| Parameters | Specifications |
|---|---|
| FLCOS microdisplay | |
| Diagonal Size | 22.3 mm |
| Active area | 17.43 × 13.95 mm |
| Resolution | 1280 × 1024 pixels |
| Pixel size | 13.6 μm |
| Color technique | Field sequential color |
| LED panel | |
| Body Dimensions | 18.4 × 14.1 mm |
| Active area | 8.4 × 6.5 mm |
| Weight | 4 ± .5 grams |
| Luminance | 34800 (cd/m$^2$) |
| Color Coordinates | Red: x = .67-.43, y = .27-.33 |
| | Green: x = .14-.28, y = .64-.73 |
| | Blue: x = .11-.15, y = .04-.10 |
| Power | 340 mW |

Design of a Compact Light Engine

Figure 2:
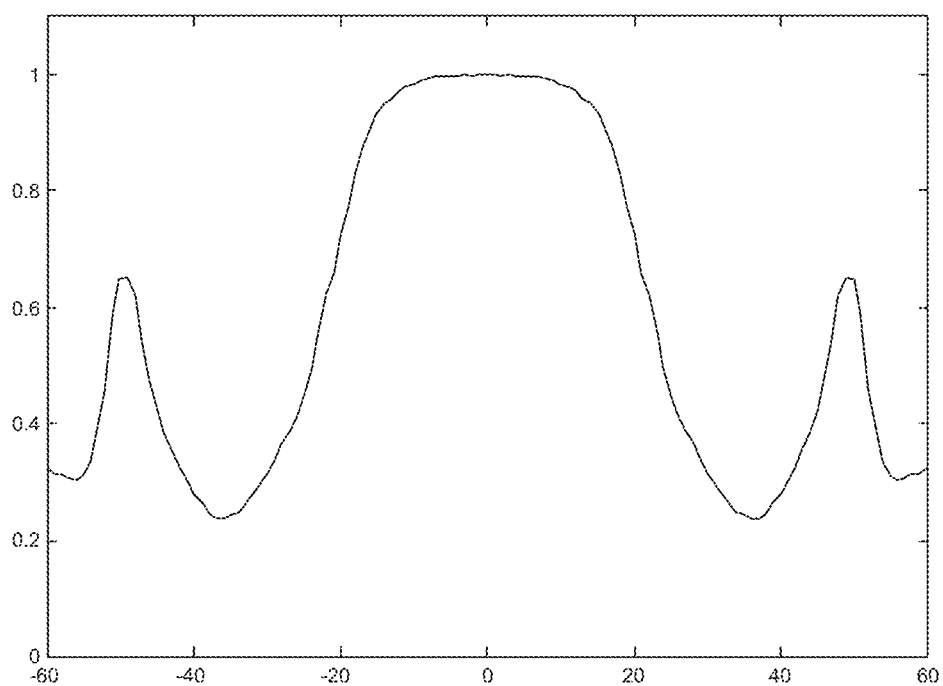
FIG. 2 illustrates the luminance distribution of an exemplary LED illuminator used in a light engine of the present invention.

Light source selection is the first step in the light engine design. Based on the design requirement of a HMPD, there are several constraints on the source selection and the light engine design. First, safety is a primary concern in any head-mounted device. Therefore sources with low power consumption and low heat dissipation are highly desired. Secondly, compactness and low weight are always critical for HMD systems. Finally, in order to generate an image with high brightness and uniformity across the whole FOV, the illumination on the microdisplay 120 should be uniform and bright. A 0.5" Alphalight™ color LED panel 102 (Teledyne Inc., Los Angeles, Calif.) is selected for the p-HMPD prototype design. The LED panel 102 is compatibly driven by the color sequential technique of the FLCOS displays. Table 1 summarizes the major specifications of the microdisplay 120 and LED panel 102. The luminance distribution of the LED panel 102, FIG. 2, is relatively uniform within 18 degrees of the emitting angle. With the requirement of image-space telecentricity on the light engine 100, a compact light engine design in accordance with the present invention is shown in FIG. 3.

The basic idea of the design of the light engine 100 is to place the LED panel 102 at the front focal point of a positive lens (or reflector) and the microdisplay 120 at the back focal point. In order to make a compact system, a concave spherical reflector 106, a PBS 104 and a quarter wave retarder 108 are used to fold the length of the system in half. The microdisplay 120 is disposed at the conjugate position of the LED panel 102, and both the microdisplay 120 and LED panel 102 are at the focal point of the reflector 106. With a polarizer 114 in front of the LED panel 102, S-polarized light from the LED panel 102 is transmitted through the polarizer 114 and is reflected by the PBS 104. A quarter-wave retarder 108 is placed between the reflector 106 and PBS 104 and its fast axis is at 45 degrees with the polarization direction of S-polarized light. By passing through the retarder 108 twice, the reflected light by the reflector 106 becomes P-polarized light and will transmit the PBS 104 to illuminate the microdisplay 120 with high efficiency.

In this design, the LED panel 102 itself can be taken as the pupil of the system to form an image-space telecentric system, where the ray bundle received by the microdisplay 120 is symmetric with the display normal. With both LED panel 102 and microdisplay 120 at the focal point of the reflector 106, the light distribution on the microdisplay 120 is the Fourier transform of that of the LED panel 102. Thus the spatial distribution on the microdisplay 120 can be derived as $$E_{display}(x, y) = L^* \Omega = L_{LED}\left(\arctan\left(\frac{\sqrt{x^2 + y^2}}{f}\right)\right) * \frac{S_{LED}}{f^2}, \quad (1)$$

where $E_{display}(x,y)$ is the illuminance at (x,y) on the display assuming the center of the display is at the origin, $L_{LED}(\theta)$ is the luminance of LED panel 102 as a function of angle, $S_{LED}$ is the area of the LED panel 102 and f is the focal length of the reflector 106. Across the microdisplay 120, the ratio of the luminance at the center of the microdisplay 120 to that at the edge is $$L_{LED}(0°)/L_{LED}\left(\arctan\left(\frac{D}{2f}\right)\right)$$

while D is the diagonal size of the microdisplay 120. To get better uniformity on the microdisplay 120, a reflector 106 with larger focal length is preferred. But meanwhile, larger focal length will result in a less compact structure and a smaller solid angle with lower luminance efficiency. Considering all these factors, a reflector 106 with 35 mm focal length and 35 mm diameter was selected. As a result, the ratio of the maximum luminance to the minimum luminance on the microdisplay 120 is 1:0.82, and the cone angle of the ray bundle on the microdisplay 120 is within 8.6 degrees. The light within the cone angle of 18 degrees emitted by the LED panel 102 can be collected by the reflector 106 to illuminate the microdisplay 120 while the light emitted at a larger angle is wasted.

Figure 4:
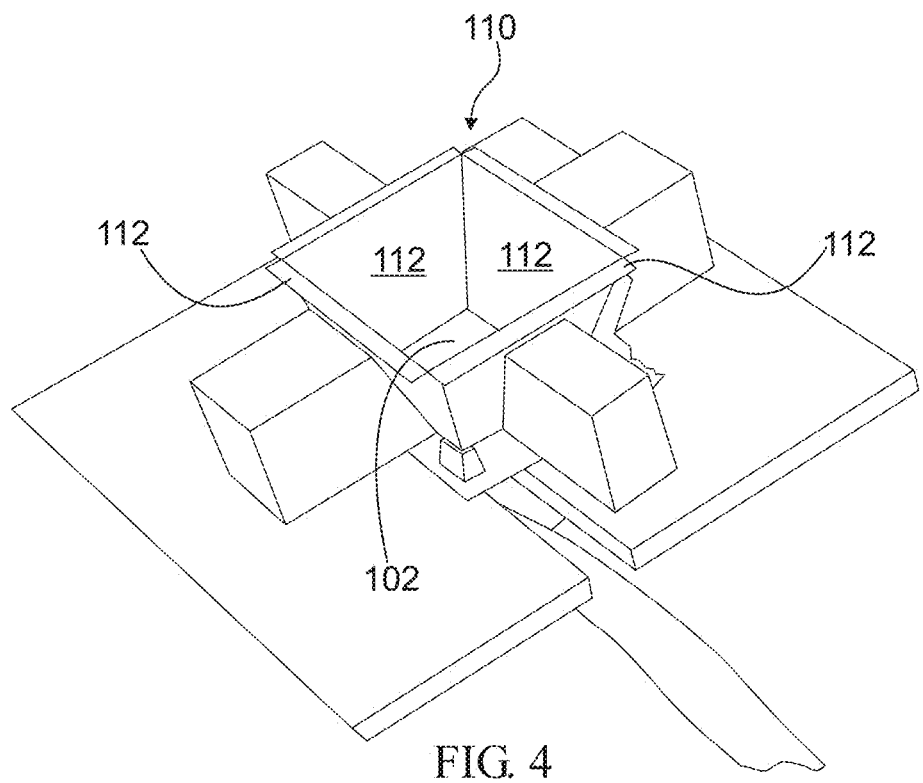
FIG. 4 illustrates a prototype of a mirror based light pipe of the light engine of the present invention.
Figure 5:
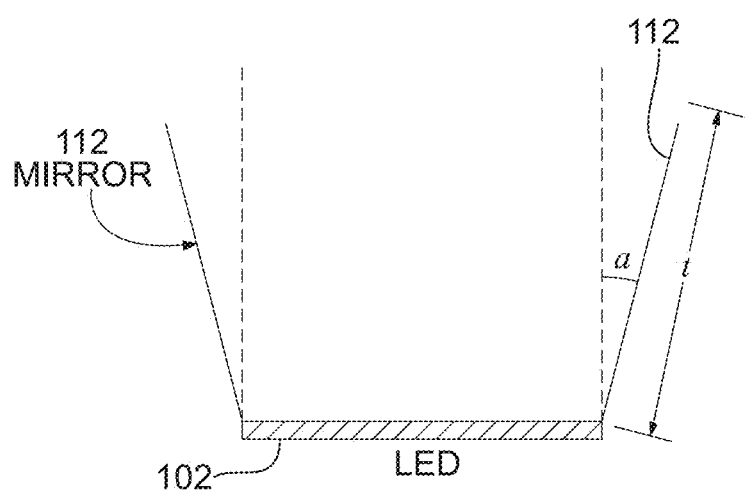
FIG. 5 schematically illustrates an exemplary design of the tapered light pipe of FIG. 4.

In order to further improve the light efficiency and uniformity of the light engine 100, a mirror-based tapered light pipe 110 was designed to recycle the light with emission angles larger than 18 degrees. FIG. 4 shows a prototype design of the light pipe 110. It is composed of four mirrors 112, each of which is tilted by an angle with respect to the LED surface, forming a truncated pyramid shape. The light emitted from the LED panel 102 with large angles will be reflected by the enclosing mirrors 112. After reflection, more rays from LED panel 102 can be collected by the reflector 106 to illuminate the microdisplay 120. To get the best performance of the light engine 100, both tilt angle, a, and length, t, of the light pipe mirror 112, as shown in FIG. 5, should be optimized.

Numerical Simulation

Figure 6A:
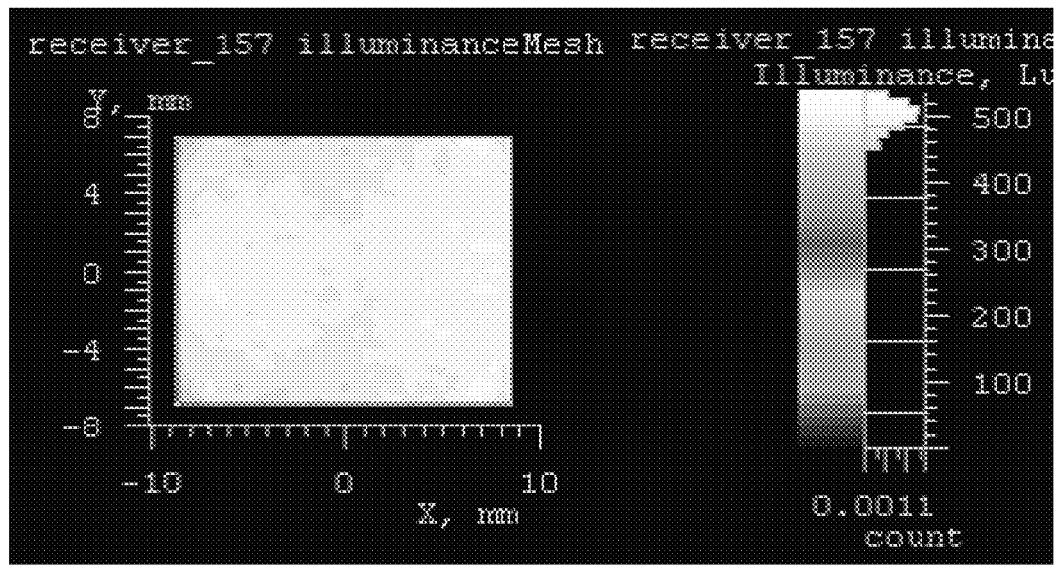
FIGS. 6A, 6B illustrate the illuminance distribution on the microdisplay provided by the light engine of FIG. 3, without and with light pipe, respectively.
Figure 6B:
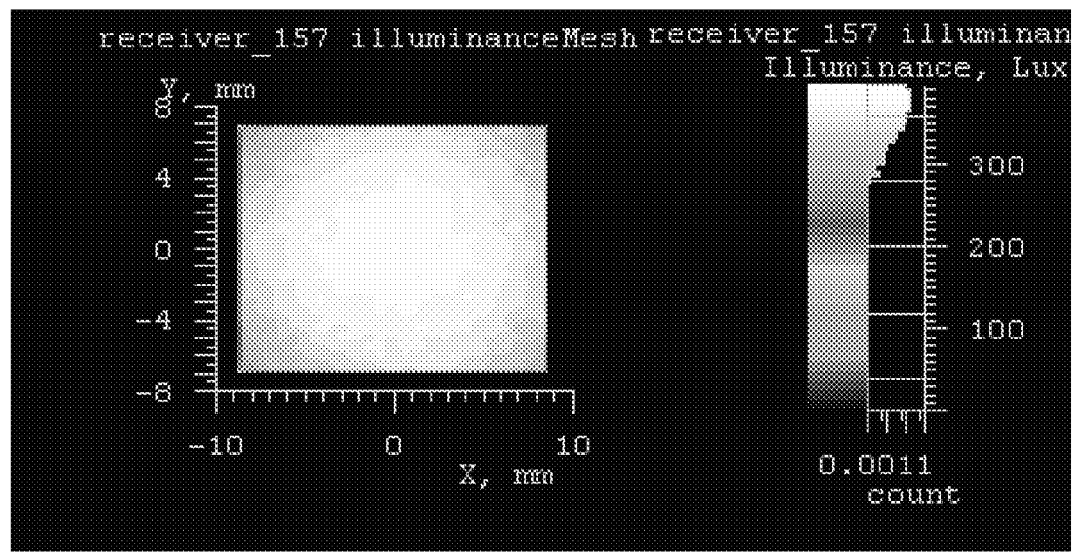

To determine the parameters of the tapered light pipe 110 and to examine the light efficiency and uniformity of the light engine 100, the light engine 100 was modeled using LightTools® (Optical Research Associates, Pasadena, Calif.). In the simulation, the total power of the source was set to be 1 lumen. A light receiver was placed on the microdisplay 120 to estimate the efficiency of the light engine 100 and to evaluate the light distribution on the microdisplay 120. Through the simulation, it is shown that the light engine 100 has higher uniformity and light efficiency when the tilt angle, a, of the mirror is 18 degrees. By balancing the performance and space constraint of the light engine 100, the mirror length, t, is selected to be 8 mm. FIG. 6B shows the output illuminance distribution on the microdisplay 120 for a system with the mirror based light pipe 110, and FIG. 6A shows the output illuminance distribution on the microdisplay 120 for the same system as FIG. 6B but without the light pipe mirrors 112 in place. Hence, comparison between FIGS. 6A, 6B illustrates the improvement in performance of the light engine 100 due to the presence of the light pipe mirrors 112.

As indicated by the simulation results, with a mirror based light pipe 110, the light efficiency has increased from 8.93% to 12.3%, and the non-uniformity, quantified by the average standard deviation of the illuminance distribution across the display area, has reduced from 5.61% to 2.15%. Thus, the system with the light pipe 110 has higher efficiency and better uniformity than without.

Design of a Compact, High-Performance Projection Lens

Based on the design of the light engine 100, a lightweight and compact image-telecentric projection lens 300 is designed. In this section, the design process of the projection lens 300 is described and the performance of the projection lens 300 is analyzed.

TABLE 2

Design targets for the projection lens

| Parameter | Specification |
|---|---|
| Effective focal length | 21.6 mm |
| Entrance pupil | 10 mm |
| Image mode | Image space telecentric |
| OAL | <40 mm |
| OAL/BFL | <1.85 |
| BFL | 30.5 mm |
| FOV | 55° |
| Wavelength range | 486-656 nm |
| Distortion | <4% over FOV |
| Weight | <15-20 grams |

Projection Lens Specification

Although projection optics do not scale as much with the increase of FOV as eyepiece-type optics, which makes designing wide FOV, optical see-through HMPD systems relatively easier than conventional HMDs, there are a few factors in HMPD systems that impose limits on the FOV. First of all, the use of a planar PBS 116 or a regular beamsplitter in front of the eye, which is oriented at 45 degrees with the optical axis, sets up the FOV upper limit of 90 degrees. Furthermore, a wide FOV requires a large size of PBS 116 and retarder 118 and consequently challenges the compactness and lightweight of the display system. The limit of allowable PBS and retarder dimensions is set by the interpupilary distance (IPD), which is in the range of 55 to 75 mm for over 95% of the population. Thirdly, previous investigation on retroreflective materials shows that the retroreflectance of currently available materials drops off significantly for light incident at angles beyond ±35°. A FOV beyond 70 degrees will inevitably cause vignetting-like effect and compromise image uniformity. Finally, the angular resolution of the microdisplay 120 degrades with the increase of the FOV. Taking into account these factors, a target was set to design the projection system with a FOV of 55 degrees, which corresponds to an effective focal length (EFL) of 21.6 mm for the selected FLCOS microdisplay 120.

In addition to being image-space telecentric, the projection lens 300 must have a large back focal length (BFL) to ensure enough space for the PBS 104 which is placed between the microdisplay 120 and projection lens 300. Based on the light engine design, the BFL is chosen to be at least 30.5 mm. Thus this projection lens 300 is also a reverse telephoto lens. (It is understood that, in the designs below, the microdisplay 120 is located at the image plane, hence the reason that the BFL represents the space allotted for the PBS 104 placed therebetween.)

Since a user's eye is positioned at the conjugate position to the entrance pupil of the projection lens 300, the entrance pupil diameter is very critical for comfortable observation. Typically it is suggested the pupil diameter of the projection system for HMPDs should be around 10-12 mm. This range of pupil size allows an eye swivel of about ±21° up to 26.5° within the eye sockets without causing vignetting or loss of image with a typical 3-mm eye pupil in the lighting conditions provided by HMPDs. Furthermore, it allows a ±5 mm to 6 mm IPD tolerance for different users without the need to mechanically adjust the IPD of the binocular optics. Considering the short focal length of the optics, a target entrance pupil with a diameter of at least 10 mm was selected, which leads to a projection system with an F/# of 2.16.

Figure 7:
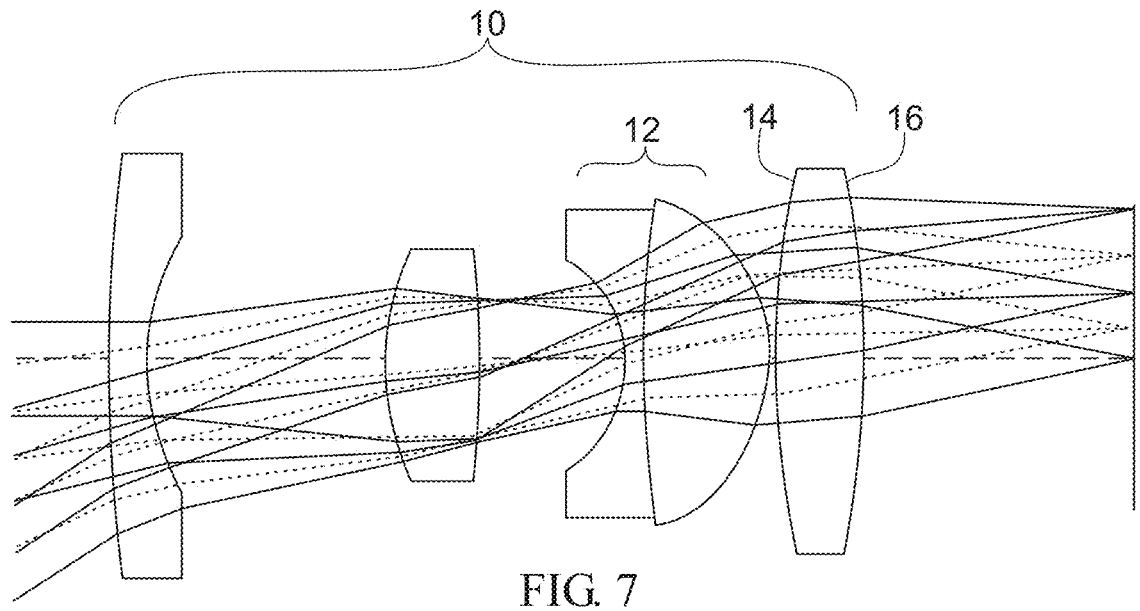
FIG. 7 illustrates the layout of an initial lens used as a starting point in the design of a projection lens of the present invention.
Figure 8A:
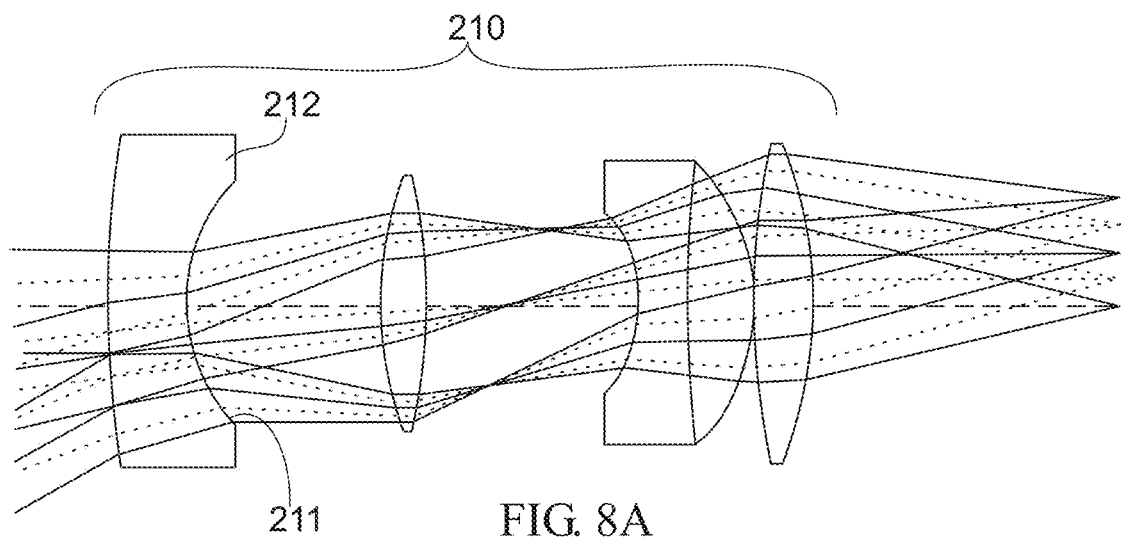
FIGS. 8A, 8B illustrate a lens layout and MTF performance, respectively, for an optimized version of the lens of FIG. 7.
Figure 8B:
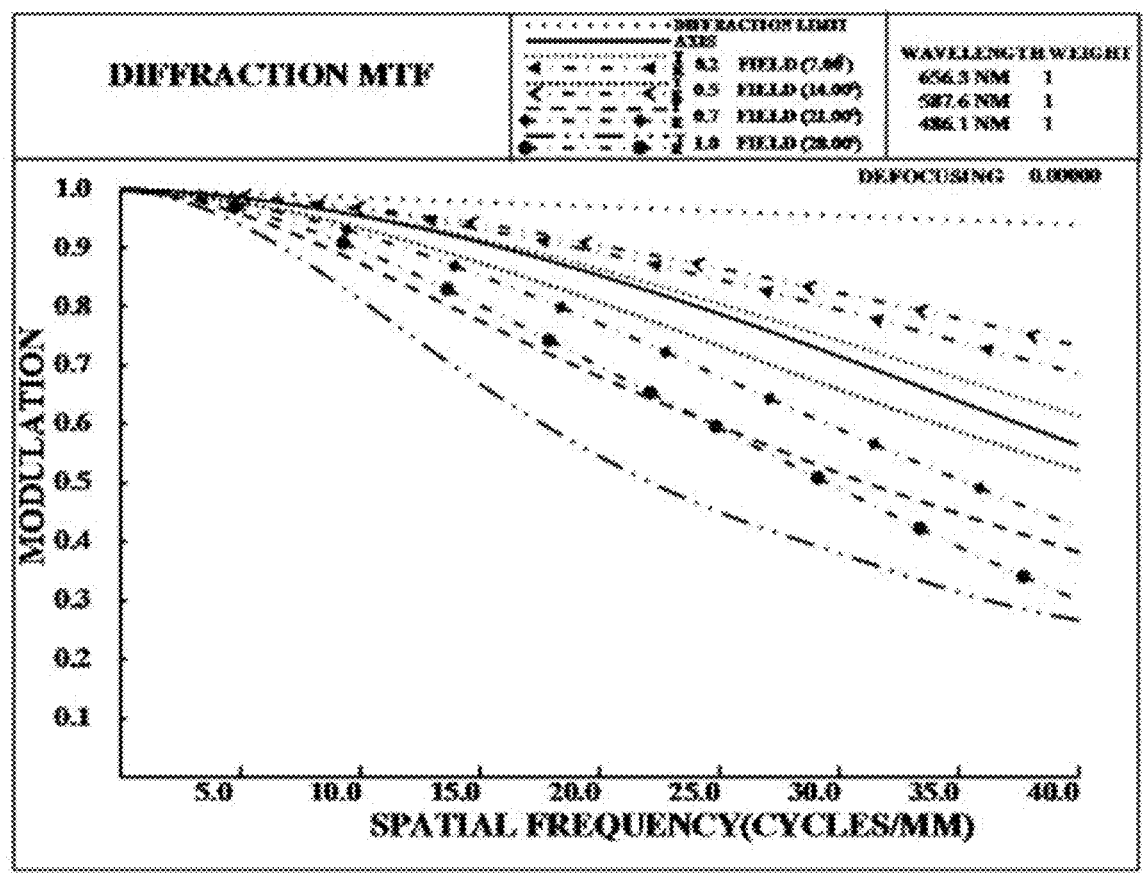

A lens 10 from Nanba U.S. Pat. No. 6,236,521 was used as the starting point of the design, with FIG. 7 showing the layout. The starting lens 10 was designed for a digital projector, and is reverse-telephoto and telecentric. Unlike a double Gauss lens, the starting lens 10 has an asymmetric structure relative to the stop because of the telecentric requirement in image space. This five-element starting lens 10 offers a full FOV of 65 degrees with an F/# of 2.5. Among the five glass elements, a doublet 12 is used, and the front surface 14 of the last element 16 is aspheric to help correct spherical aberration. The ratio of the BFL to the EFL of the lens 10 is 1.13 and the ratio of the overall length (OAL. As used herein, OAL refers to the distance from the first surface of the first optical element to the last surface of the last optical element) of the optics to the EFL is 3.15. The ratio of the exit pupil distance to the EFL is 13.6, which makes the lens 10 telecentric in image space. By scaling and several cycles of optimization with CODE V® (Optical Research Associates, Pasadena, Calif.), a new starting lens 210 was obtained to meet the first-order design targets of 21.1 mm EFL, 30 mm BFL and 68 mm OAL, as shown in FIG. 8A and Table 3. The full FOV is set to be 55 degrees. As shown in FIG. 8B, the MTF of the lens 210 is around 30% at the spatial frequency of 37-lp/mm, which shows acceptable performance as a first-order starting point for the design.

TABLE 3

Numerical values for lens of FIG. 8.

| Surface No. | Surface type | Radius | Thickness | Lens material |
|---|---|---|---|---|
| 1 | Sphere | 151.9831514 | 7.199 | 772499.496 |
| 2 | Sphere | 18.31108732 | 18.74851 | |
| 3 | Sphere | 37.26417226 | 4.646097 | 772499.496 |
| 4 | Sphere | 51.05918244 | 9.065786 | |
| stop | Sphere | 1.00E+18 | 11.41511 | |
| 6 | Sphere | 14.31228599 | 4.642326 | 846660.238 |
| 7 | Sphere | 121.7152043 | 6.393417 | 677900.553 |
| 8 | Sphere | 20.60785676 | 0.1 | |
| 9 | Asphere | 60.8179454 | 5.789755 | 772499.496 |
| 10 | Sphere | 38.94828517 | 29.99994 | |

| Asphere parameters for surface 9 | |
|---|---|
| 4th Order Coefficient (A) | −8.95E−06 |
| 6th Order Coefficient (B) | 6.83E−09 |
| 8th Order Coefficient (C) | −1.56E−11 |
| 10th Order Coefficient (D) | 2.28E−14 |

The projection lens 210 is rotationally symmetric, and thus the optimization is only necessary over half of the full FOV for the radial direction. Three representative wavelengths (i.e., 486 nm, 589 nm and 656 nm) were set with the weights of 1, 2 and 1, respectively. Five fields, corresponding to 0, 7°, 14°, 21° and 27.5°, respectively, were used in the optimization process to represent the half FOV. The weights of the five fields were adjusted in the optimization process to balance the MTF performances across the entire FOV. During the optimization, all surface curvatures, surface thicknesses, and coefficients of aspheric surfaces were set to be variables. Several constraints were set to satisfy the specifications of the overall system and each individual lens element, including the EFL, BFL, OAL, distortion requirements, and the center thickness of individual elements, for example. The telecentric requirement was satisfied by setting the exit pupil distance to be at least 210 mm from the image plane. This distance corresponds to a deviation of the chief ray by 3° from a perfectly telecentric system, which yields a good balance between the overall optical performance and the system compactness considering the difficulty in designing a perfectly telecentric lens with a short OAL.

Figure 9A:
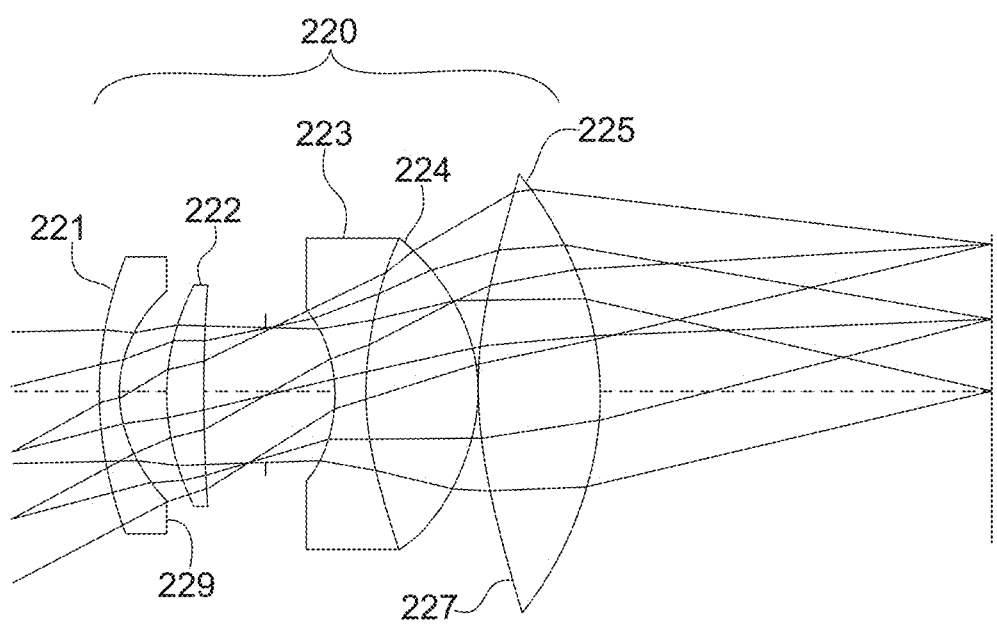
FIGS. 9A, 9B illustrate a lens layout and MTF performance, respectively, for further optimized version of a projection lens of the present invention which is more compact than the lens of FIG. 8.
Figure 9B:
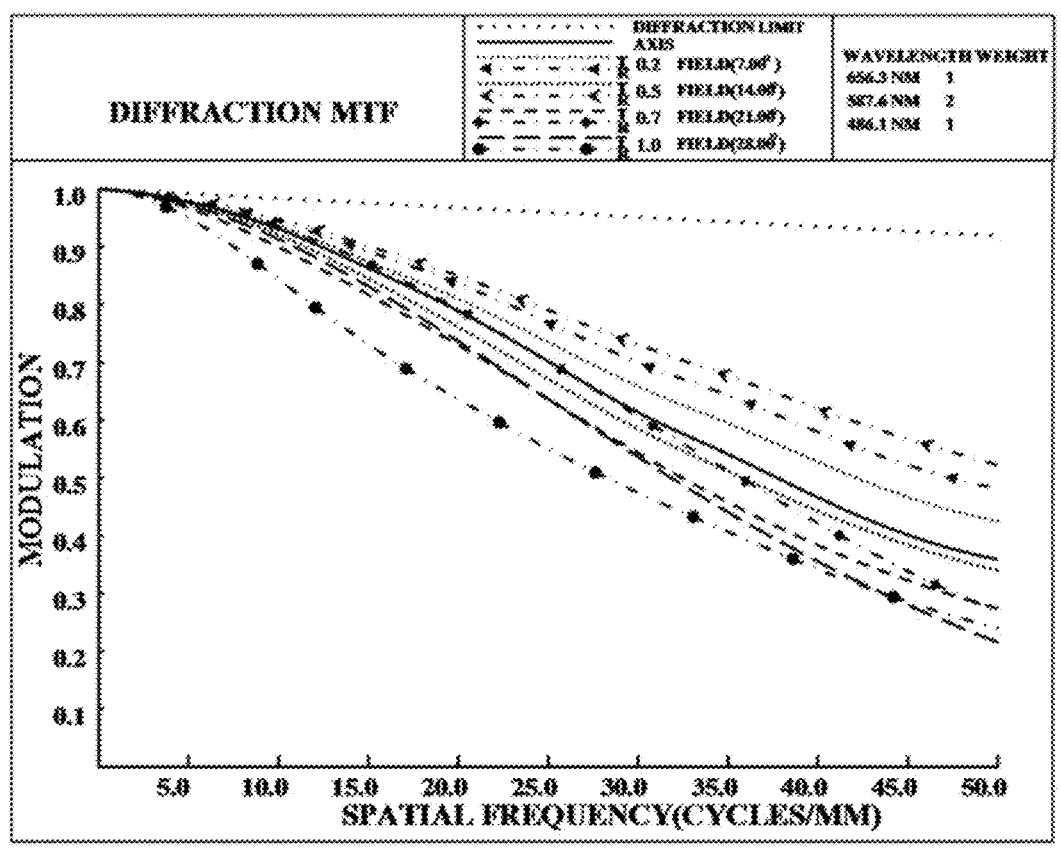

One of the major problems of the lens 210 in FIG. 8A is its compactness: the OAL is too large for a head-mounted system and a more compact solution is needed. This initial lens 210 was gradually optimized by adjusting the parameter constraints and field weights through a local optimization approach. While the OAL was reduced down to about 40 mm in the process of optimization, the overall performance was degraded as well. In order to further improve its performance, the back surface 211 of the first lens element 212 was set to be aspheric, which helped to correct most of the spherical aberration. After gradual optimization, a system was obtained with satisfactory performance. The resulting lens layout and MTF are shown in FIGS. 9A, 9B.

This lens 220 is composed of five glass elements 221-225 (with aspheres on two surfaces 227, 229) and weighs about 38.7 grams, which needs to be significantly reduced to obtain a lightweight p-HMPD system. Plastic materials were selected to replace the glass elements 221-225. Considering that the density of glass is about three times of most plastics, it is expected that the weight of the lens 220 would drop to around 10 grams. The drawback of using the plastic materials is also obvious. While there are many choices of optical glass, from low to high refractive index and low to high Abbe number, for plastics only very limited number of materials are available for diamond turning fabrication.

The initial target was to replace the glass elements 223-225 on the right side of the stop with the plastics, since they contributed most of the weight due to their large aperture. Polystyrene with low Abbe number and Cyclic Olefin Polymer (COC) with relatively high Abbe number were selected to replace the glass materials of the doublet 223, 224. After this replacement, the optimization was rerun to achieve the desired specifications of the lens 220. Since the last element 225 has the highest optical power among all the elements in the lens 220 and high Abbe number, COC was selected for the last element 225. Unfortunately, after the plastic replacement the system had much worse performance compared with the system before replacing the last glass element 225. Chromatic aberration dominates the resulting system. To effectively correct the residual chromatic aberration, a diffractive optical element (DOE) was added to the system.

A DOE can be viewed as a material with large dispersion but opposite in sign to conventional materials, i.e., the Abbe number of a DOE is approximately −3.5 for the visible spectrum. This DOE with negative Abbe number would help to correct the chromatic aberration. The substrate shape of a diffractive surface DOE can be spherical, planar being a special case, or aspheric. The commonly used orders of diffraction are 0, −1, or 1. The +1 order of diffraction was adopted. The diffractive surface can be used on any of the lens surfaces as long as it can help to correct the chromatic aberration. However, after a few trials, it was found to be most effective to place the diffractive surface on the left surface 227 of the last element 225. The DOE quadratic coefficient was set to be a variable up to 12 orders in the optimization process. Finally, to further reduce the lens weight, the first two glass elements 221, 222 on the left of the stop were replaced with Acrylic and Polystyrene, respectively.

Figure 10:
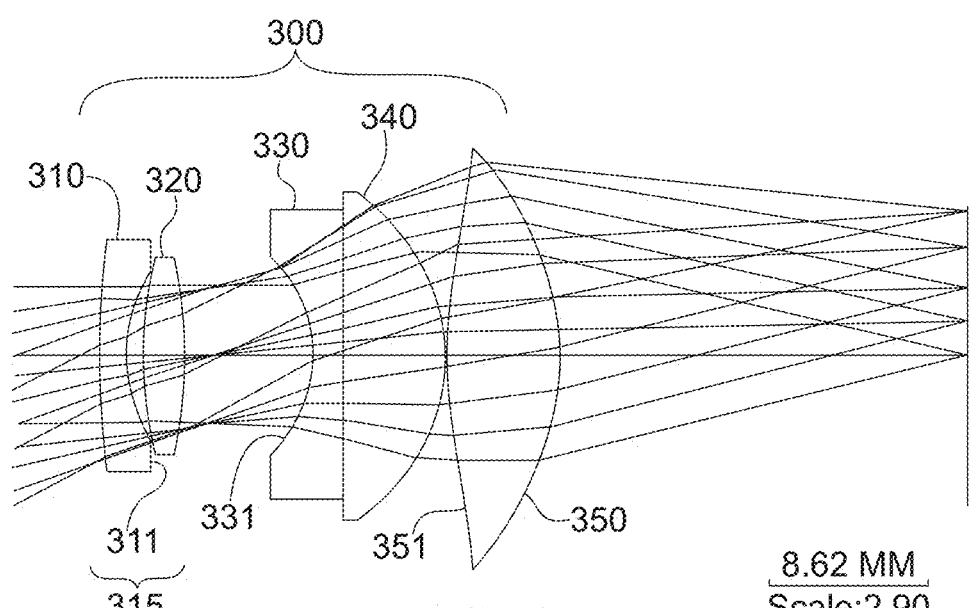
FIG. 10 illustrates the layout of the final design of an exemplary projection lens of the present invention.

Considering the fact that a doublet requires higher cost in the fabrication process, the doublet 223, 224 was split into two single elements. The split of the doublet 223, 224 also offered extra freedom in the optimization, and helped improve the overall performance. Finally, through several rounds of optimization, a telecentric lens 300 with an OAL of 34 mm and a total weight of 8.2 grams was obtained. The ratio of the weight of the lens to the square of the F-number was 1.86 to 1. FIG. 10 shows the layout of the final design of the projection lens 300, and Tables 4-9 shows the design parameters and first order properties of the lens 300.

TABLE 4

Numerical values for the lens of FIG. 10.

| Surface No. | Surface type | Radius | Thickness | Material |
|---|---|---|---|---|
| 1 | Sphere | 54.31648697 | 2 | Acrylic |
| 2 | Asphere | 11.67695001 | 1.31979 | |
| 3 | Sphere | 29.18891338 | 2.71793 | Polystyrene |
| 4 | Sphere | −53.75253258 | 3.106908 | |
| 5(stop) | Sphere | Infinity | 6.769705 | |
| 6 | Asphere | −9.34878697 | 2.5 | Polystyrene |
| 7 | Sphere | −109.22569406 | 0.2 | |
| 8 | Sphere | −93.99209709 | 7.088732 | Cyclic Olefin Polymer |
| 9 | Sphere | −14.34048220 | 0.1 | |
| 10 | Asphere | 36.51968881 | 8.196935 | Cyclic Olefin Polymer |
| 11 | Sphere | −22.22836849 | 30.5 | |
| image | Sphere | Infinity | 0 | |

TABLE 5

Numerical values for aspheric surfaces of the lens of FIG. 10.

| Element | Focal length (mm) |
|---|---|
| 1st element | −30.7666976612 |
| 2nd element | 32.4497012224 |
| First two elements | −7837.900440744 |
| 3rd element | −17.48717528244 |
| 4th element | 30.96961073305 |
| 5th element | 25.97749355667 |

TABLE 6

Numerical values for aspheric surfaces of the lens of FIG. 10.

| Surface | Surface 2 | Surface 6 | Surface 10 |
|---|---|---|---|
| Conic Constant (K) | 1.19517273E+00 | 2.87739760E−01 | −1.73713081E+01 |
| 4th Order Coefficient (A) | −9.17398530E−05 | 1.55078027E−04 | 1.87808847E−07 |
| 6th Order Coefficient (B) | −6.00685014E−06 | 1.60075455E−06 | −1.36998214E−07 |
| 8th Order Coefficient (C) | 2.67960130E−07 | −1.10443177E−07 | 7.55859302E−10 |
| 10th Order Coefficient (D) | −9.29841239E−09 | 4.67064799E−09 | −2.04509691E−12 |
| 12th Order Coefficient (E) | 1.54727549E−10 | −8.56490951E−11 | 2.26702680E−15 |
| 14th Order Coefficient (F) | −1.16675172E−12 | 6.81530567E−13 | −1.54585020E−19 |

TABLE 7

Numerical values for the DOE of the lens of FIG. 10.
Diffraction Order = 2
Construction Wavelength = 550

| | |
|---|---|
| R**2 (C1) | −1.06653506E−03 |
| R**4 (C2) | 4.09441040E−06 |
| R**6 (C3) | −4.17021652E−08 |
| R**8 (C4) | 2.36559269E−10 |
| R**10 (C5) | −6.59579639E−13 |
| R**12 (C6) | 7.29317846E−16 |

TABLE 8

Numerical values for optical materials of the lens of FIG. 10.

| Trade Name | Acrylic Plexiglas | Polystyrene Styron | Cyclic Olefin Polymer Zeonex |
|---|---|---|---|
| nf (486.1 nm) | 1.497 | 1.604 | 1.537 |
| nd (589 nm) | 1.491 | 1.590 | 1.530 |
| nc (656.3 nm) | 1.489 | 1.585 | 1.527 |

TABLE 9

First order properties of the lens of FIG. 10 at infinite conjugates.

| | |
|---|---|
| EFL | 21.6000 |
| BFL | 30.5000 |
| FFL | 4.5965 |
| F No | 2.1600 |
| Image distance | 30.5000 |
| OAL | 34.0000 |
| Paraxial image height | 11.2442 |
| Paraxial image Ang | 27.5000 |
| Ent pupil diameter | 10.0000 |
| Ent pupil thickness | 7.0384 |
| Exit pupil diameter | 88.4570 |
| Exit pupil thickness | −160.5672 |

The lens 300 includes five lens elements 310, 320, 330, 340, 350 ordered left-to-right from object space to image space. The first two lens elements 310, 320 form a first lens group 315 having very little optical power (e.g., the focal length of the lens group 315 is two orders of magnitude larger than that of the lens 300, see Tables 5, 9) disposed to the left of the stop. The first lens element 310 is a negative meniscus lens having two surfaces that are concave towards image space, with the surface 311 closest to image space being aspheric. The second lens element 320 is a positive lens disposed adjacent the first lens element 310. The third through fifth lens elements 330, 340, 350 are disposed on the right side of the stop, with the third element 330 closest to the stop being a negative lens and the fourth and fifth elements 340, 350 closest to the image plane being positive lenses. The first surface 331 of the third lens element 330 closest to the stop is aspheric as is the first surface 351 of the fifth lens element 350. In addition, the first surface 351 of the fifth lens element 350 includes the aforementioned DOE.

Performance Analysis of the Projection Lens

Figure 11A:
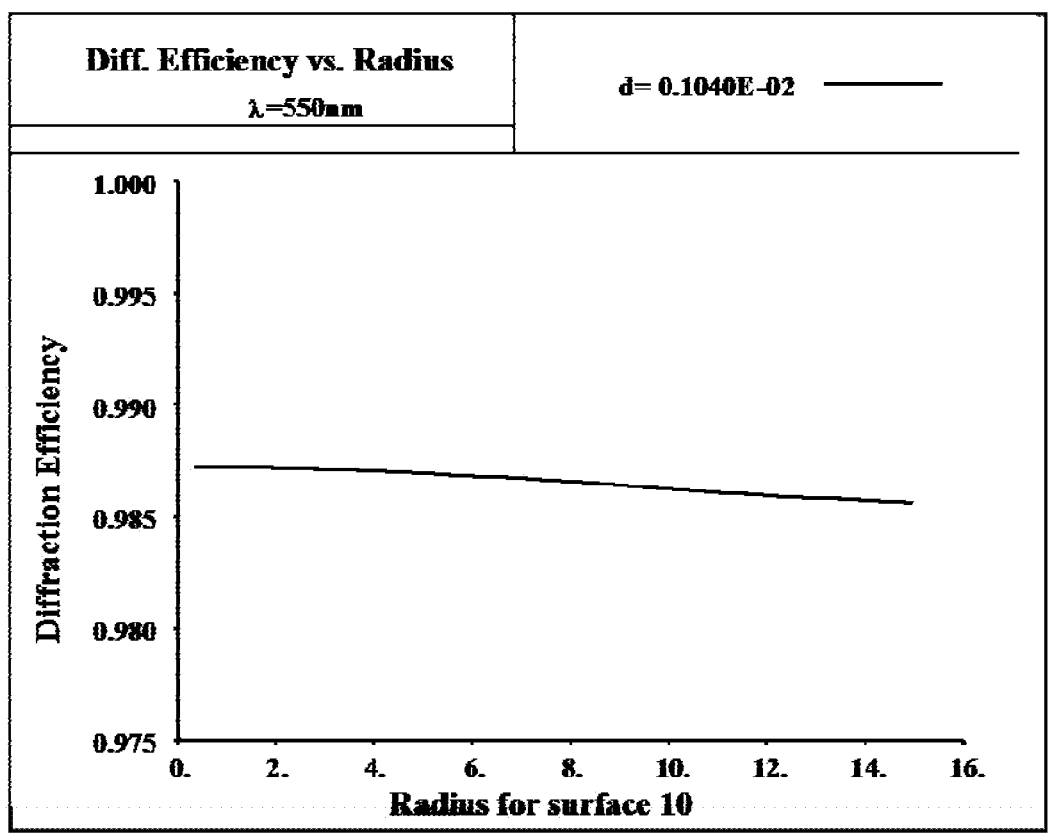
FIGS. 11A, 11B illustrate the diffraction efficiency versus radius and diffraction efficiency versus wavelength, respectively, for the projection lens of FIG. 10.
Figure 11B:
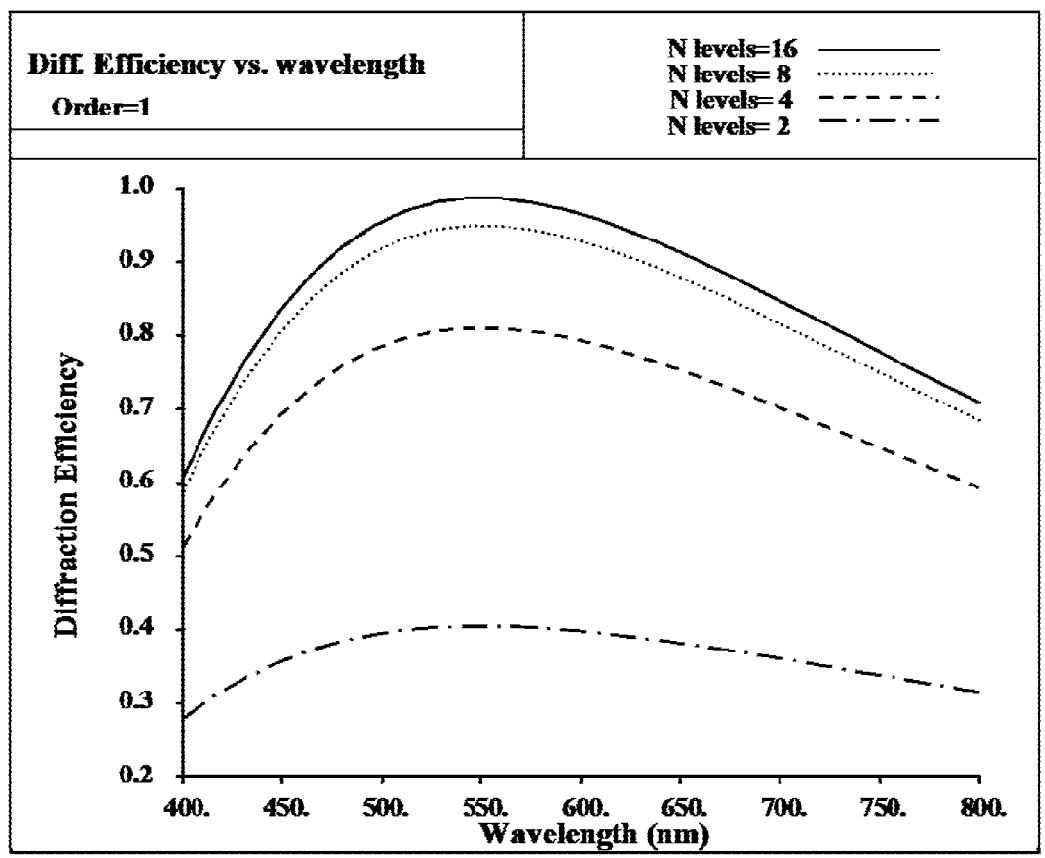

The diffraction efficiency of a DOE drops as its physical features become finer near the edge. FIG. 11A shows the diffraction efficiency as a function of the radius of diffractive surface at the designed wavelength 550 nm. The overall efficiency varies from 98.7% at the center to 98.5% at the edge. The diffraction efficiency is also wavelength dependent. FIG. 11B plots the diffraction efficiency as a function of wavelengths as well as the levels of the binary masks (i.e., 2, 4, 8, 16). Level 16 could be an accurate prediction for the Kinoform DOE using diamond turning method for fabrication. It shows that the diffraction efficiency varies from 80% to 100% across the visible spectrum.

Figure 12A:
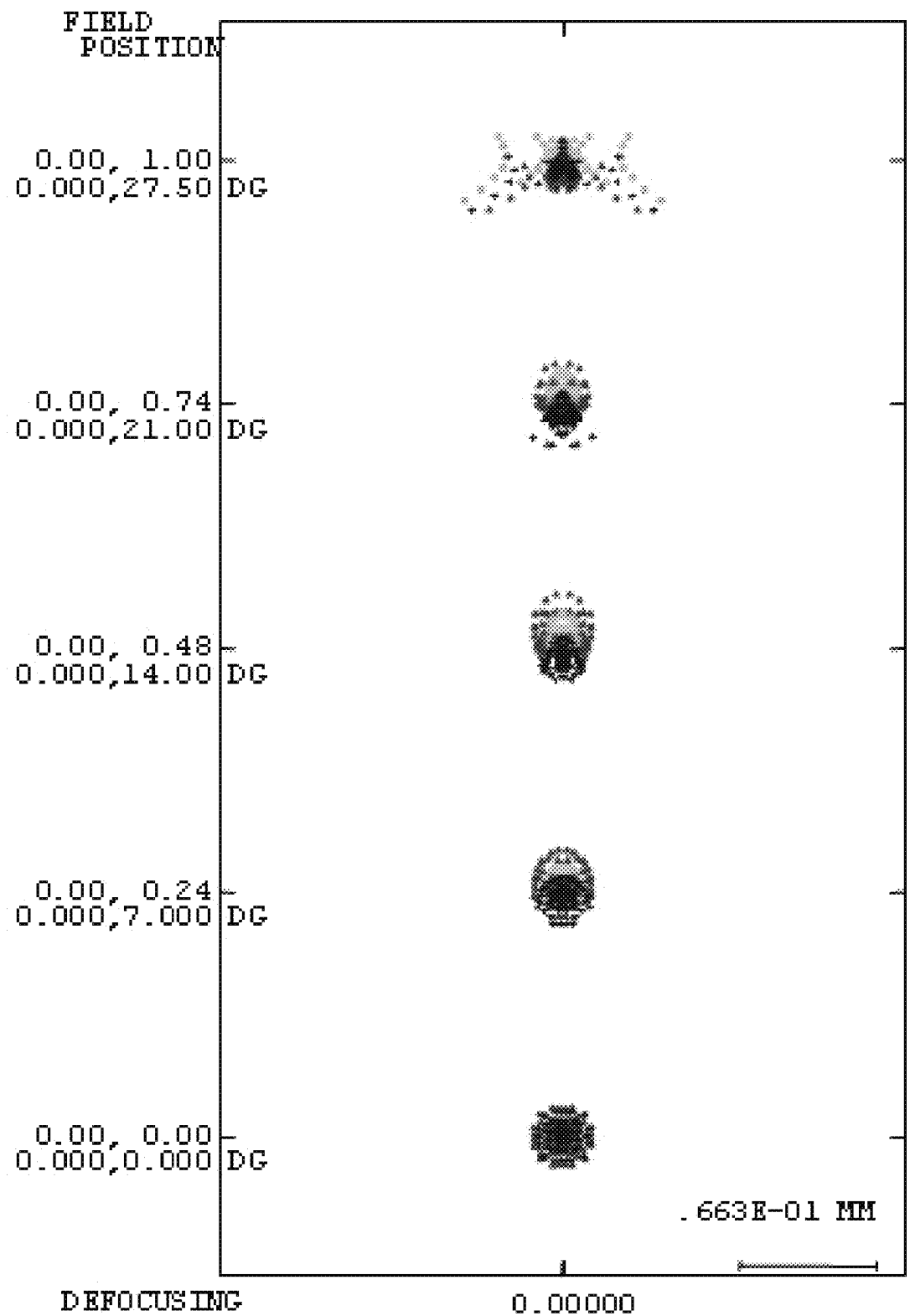
FIGS. 12A, 12B illustrate a spot diagram and ray fan plot, respectively, for the projection lens of FIG. 10.
Figure 12B:
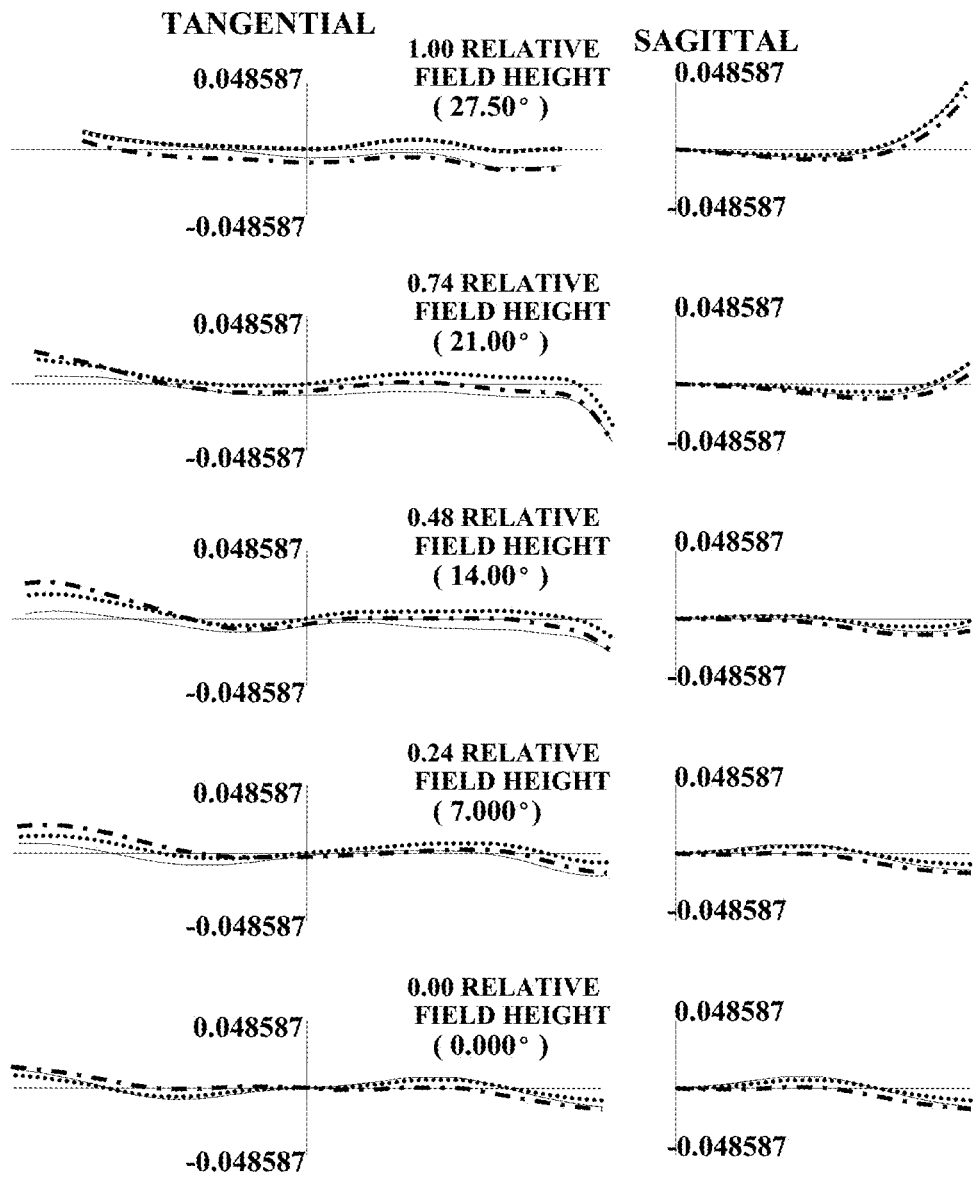
Figure 12C:
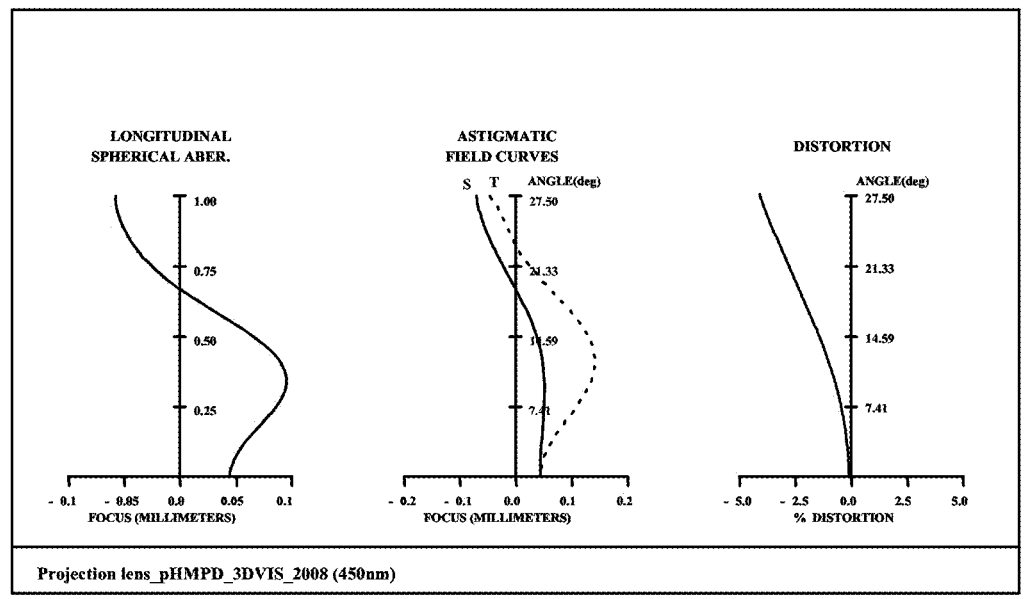
FIGS. 12C-12E illustrate the longitudinal spherical aberration, astigmatism, and distortion at 450 nm, 550 nm, 650 nm, respectively, for the projection lens of FIG. 10.
Figure 12D:
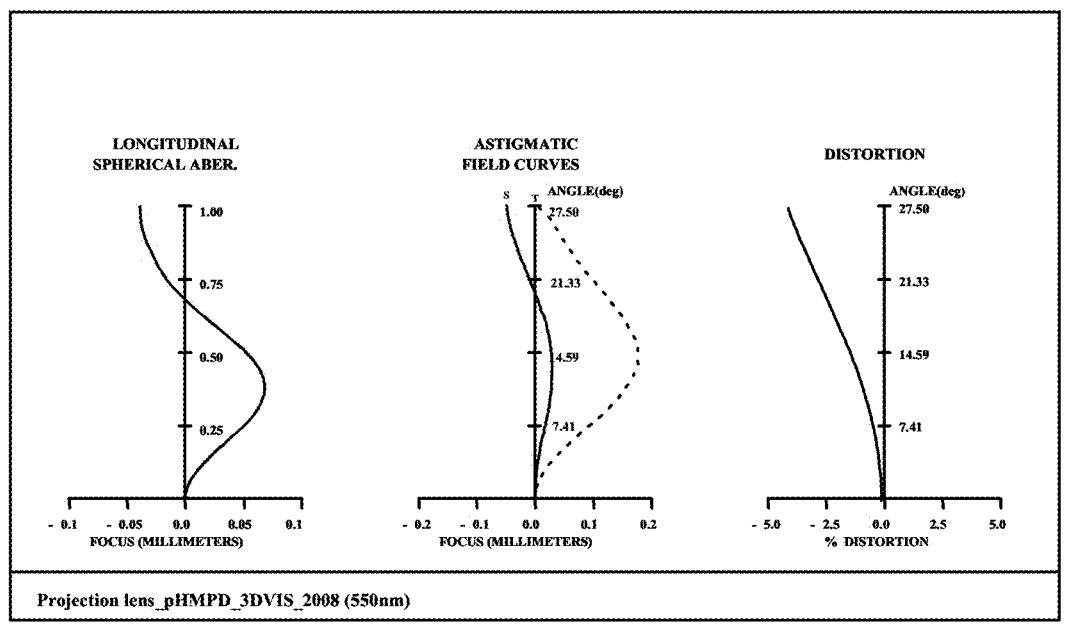
Figure 12E:
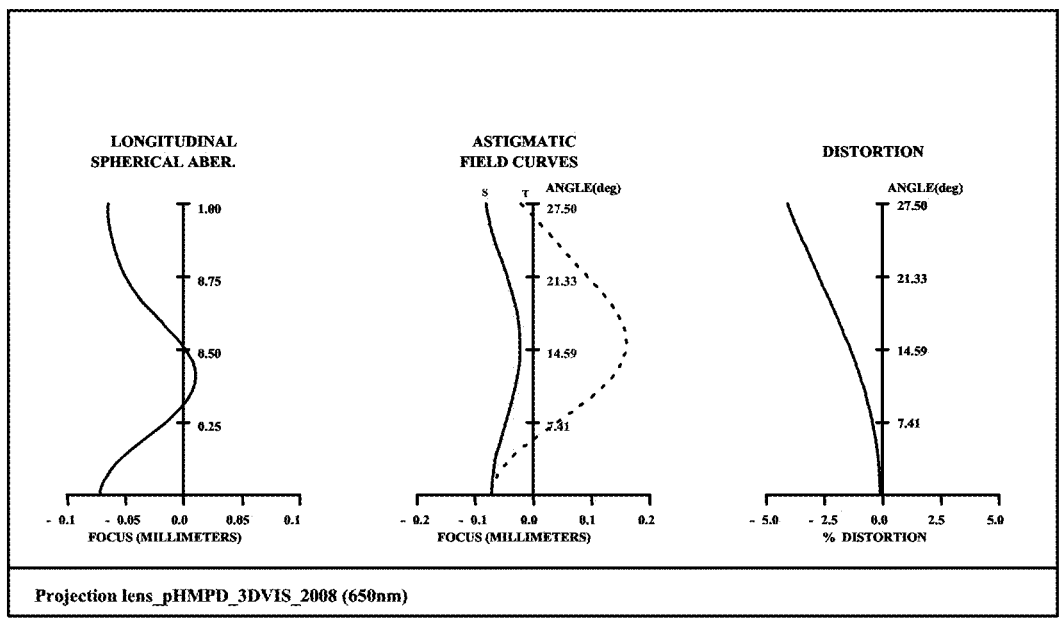
Figure 12F:
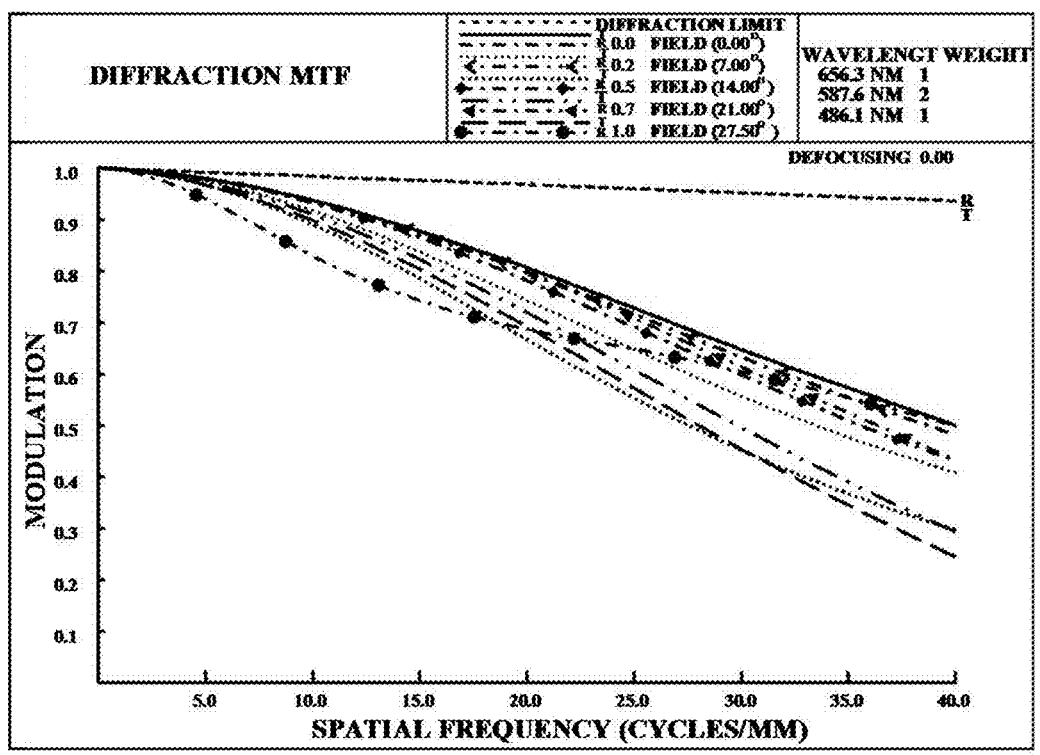
FIG. 12F illustrates the MTF performance for the projection lens of FIG. 10.

The optical performance of the optimized lens 300 is assessed on the image plane at the five representative field angles for three different wavelengths. The spot diagrams are shown in FIG. 12A. The average RMS spot diameter across the FOV is around 16 μm, which is slightly larger than the 13.6 μm pixel size to avoid pixellated artifacts. FIGS. 12C-E shows longitudinal spherical aberration, astigmatism, and the distortion curves. The longitudinal spherical aberration and astigmatism are well balanced, and the distortion of the system is limited within 4% across the FOV. The MTF of the lens 300 is presented in FIG. 12F. The FLCOS microdisplay 120 has a threshold spatial frequency of 36.8-lp/mm given a 13.6 μm pixel size (i.e. threshold spatial frequency=1/(2*pixel size)). The modulation is about 40% at 36.8-lp/mm across the whole FOV, which means the performance of the system is currently limited by the display resolution.

p-HMPD Prototype

Figure 1:
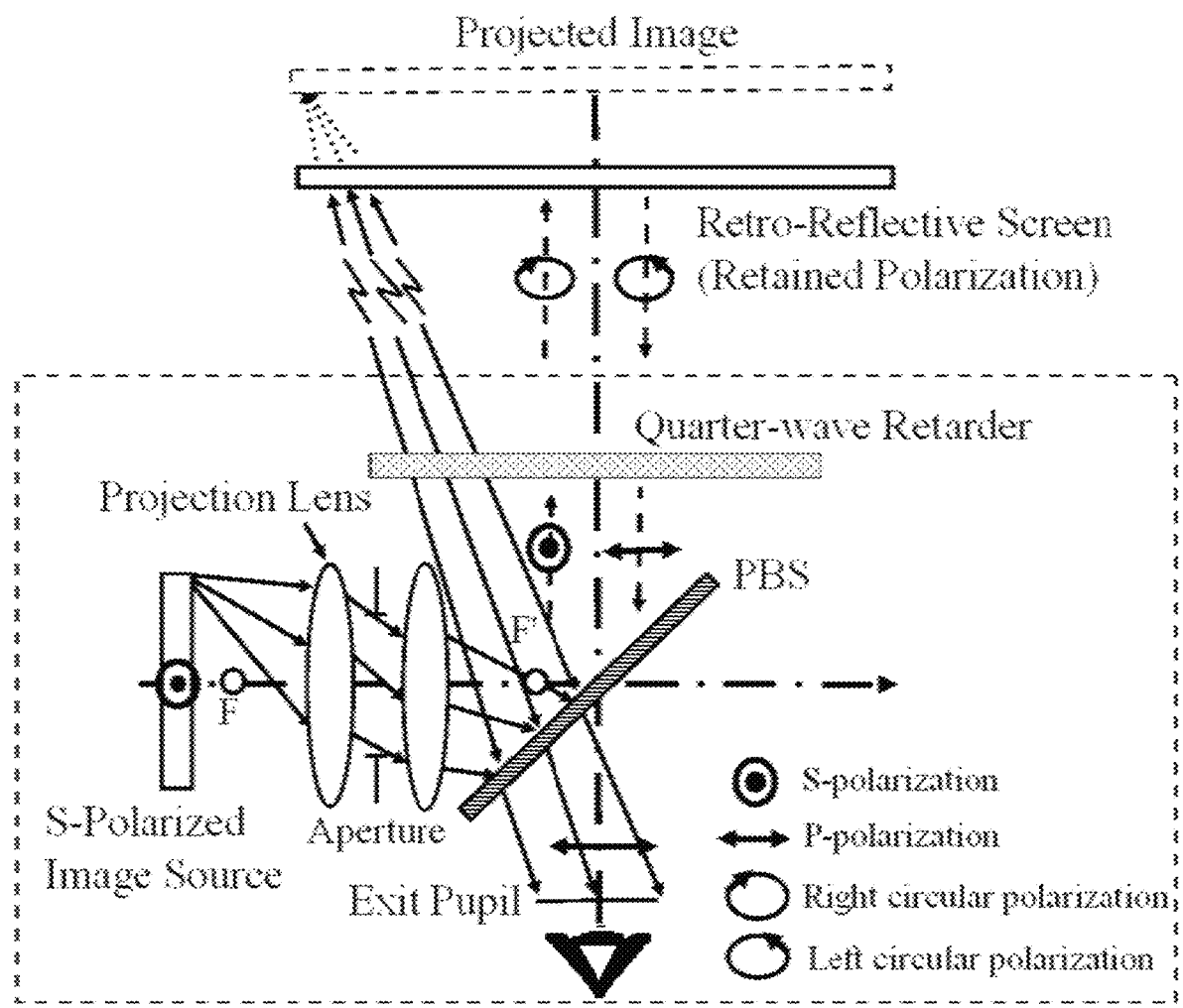
FIG. 1 schematically illustrates a polarized HMPD system comprising a transmissive AMLCD and retroreflection screen.
Figure 13A:
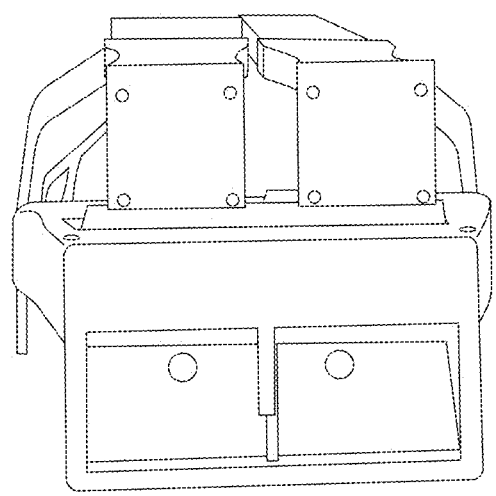
FIGS. 13A, 13B illustrate a front view and a side perspective view, respectively, of a prototype of a polarized head-mounted projection display of the present invention.
Figure 13B:
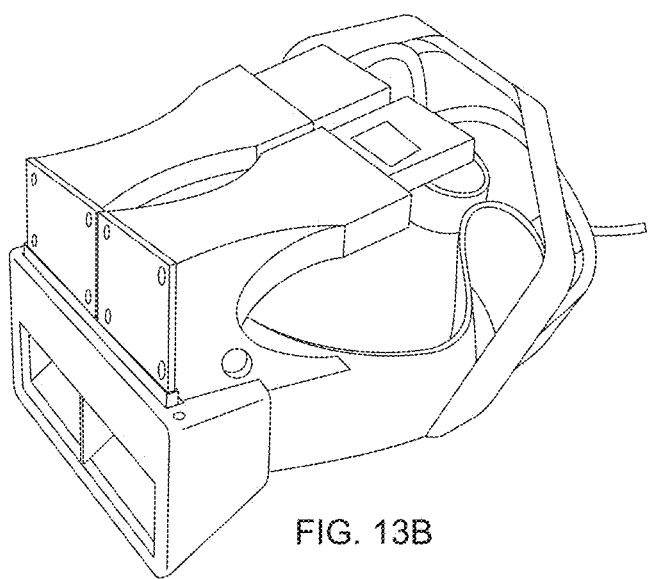
Figure 14:
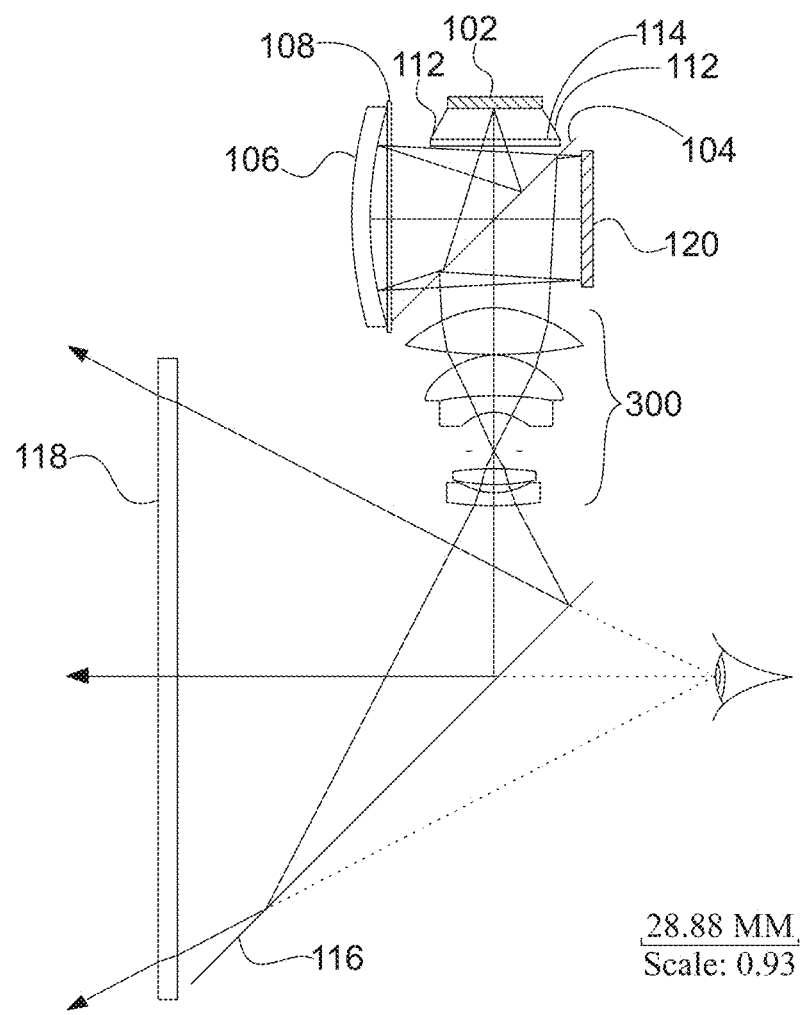
FIG. 14 schematically illustrates polarized head-mounted display in accordance with the present invention which includes the light engine of FIG. 3 and projection lens of FIG. 10.

With the design of the light engine 100 and projection lens 300 complete, a prototype of the new p-HMPD was built, FIGS. 13-14. The p-HMPD included the light engine 100, microdisplay 120, and projection lens 300, as well as an additional PBS 116, quarter-wave retarder 118, and retro-reflective screen, which are disposed in the same relative positions to provide the same function as the PBS, quarter-wave retarder, and retro-reflective screen of FIG. 1. Compared with the p-HMPD prototype using transmissive LCD microdisplays of FIG. 1, the mounting of the optics in the new p-HMPD of FIG. 3 is more challenging for the following reasons. First, the use of the light engine 100 requires some extra space and weight. Second, the projection lens 300 designed for the FLCOS microdisplay 120 is longer due to the image-space telecentric requirement and higher image quality requirement.

Considering both the ergonomic and aesthetic factors, the optics 100, 120, 300, were mounted vertically so that the width of the helmet was around the average width of the adult head. In the vertical direction, the optics were mounted according to the shape of the head, and the associated electronics were mounted on the top of the helmet. A main drawback of the vertical mount is that a ghost image of the ground formed by the PBS 104 is overlaid with the projected image, which leads to reduced image contrast. This problem, however, can be solved by blocking the optical path from the ground.

To make the system more compact and lighter, the mount of the light engine 100 with the microdisplays 120 was fabricated separately and then integrated with the shell as a whole. The lens 300 position relative to the microdisplay 120 is adjustable to provide a projected image with adjustable magnification.

The helmet shells were fabricated using rapid prototyping techniques, in which physical models are fabricated layer by layer directly from a 3D CAD model. The helmet shells were assembled and attached to an off-the-shelf headband that offers head-size adjustment. The front and side views of the prototype are shown in FIGS. 13A, 13B, respectively.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. An optical illumination system for use with a reflective microdisplay of a headmounted display, comprising:
   a light emissive panel having a 2-dimensional surface, with a width x and length y, from which surface a light distribution is emitted;
   a reflective microdisplay; and
   a reflector having a reflector focal length associated therewith and disposed one focal length away from the surface of the panel at a location to receive the light emitted by the surface of the panel and disposed one reflector focal length away from the microdisplay to reflect light received from the panel onto the microdisplay, the reflector structured such that the light distribution on the microdisplay is the Fourier transform of the light distribution of the light emissive panel.

2. The optical illumination system according to claim 1, wherein the light emissive panel is an LED panel.

3. The optical illumination system according to claim 1, wherein the reflector comprises a concave spherical surface.

4. The optical illumination system according to claim 1, wherein light distribution on the microdisplay is $$E_{display}(x, y) = L^*\Omega = L_{LED}\left(\arctan\left(\frac{\sqrt{x^2 + y^2}}{f}\right)\right) * \frac{S_{LED}}{f^2},$$

where $E_{display}(x,y)$ is the illuminance at (x,y) on the display assuming the center of the microdisplay is at the origin, $L_{LED}(\theta)$ is the luminance of LED light emissive panel as a function of angle, $S_{LED}$ is the area of the light emissive panel and f is the focal length of the reflector.

5. The optical illumination system according to claim 1, wherein the ratio of the luminance at the center of the microdisplay to that at the edge is $$L_{LED}(0°)/L_{LED}\left(\arctan\left(\frac{D}{2f}\right)\right)$$

where D is the diagonal size of the microdisplay, $L_{LED}(\theta)$ is the luminance of LED light emissive panel as a function of angle, and f is the focal length of the reflector.

6. The optical illumination system according to claim 1, wherein ratio of the maximum luminance to the minimum luminance on the microdisplay is 1:0.8.

7. The optical illumination system according to claim 1, comprising a tapered light pipe disposed proximate the light emissive panel.

8. The optical illumination system according to claim 7, wherein the light pipe comprises a plurality of mirrors oriented in the shape of a truncated pyramid.

9. The optical illumination system according to claim 1, comprising a reverse telephoto projection lens, telecentric in image space, disposed in optical communication with the microdisplay, the microdisplay located at a back focal length of the projection lens.

10. The head-mounted projection display system according to claim 9, wherein the overall length of the projection lens is no more than 85% larger than the effective focal length of the projection lens.

11. The head-mounted projection display system according to claim 9, wherein the back focal length of the projection lens is 40% larger than the effective focal length of the projection lens.

12. The head-mounted projection display system according to claim 9, wherein the projection lens comprises a diffractive optical element.

13. The head-mounted projection display system according to claim 9, wherein the projection lens comprises a final lens element disposed closest to the image plane, the final lens element comprising a diffractive optical element disposed thereon.

14. The head-mounted projection display system according to claim 13, wherein the final lens element includes an aspheric surface.

15. The head-mounted projection display system according to claim 14, wherein the diffractive optical element is disposed on the aspheric surface.

16. The head-mounted projection display system according to claim 9, wherein the projection lens comprises a plurality of optical elements, and at least two-thirds of the optical elements comprise plastic.

17. The head-mounted projection display system according to claim 9, wherein the projection lens comprises a lens group disposed on the object side of the stop of the projection lens, the lens group having an effective focal length two orders of magnitude larger than the effective focal length of the projection lens.

18. The head-mounted projection display system according to claim 9, wherein the projection lens comprises a plurality of lens elements configured to have an overall length that is no more than two times the effective focal length of the projection lens.

* * * * *